United States Patent
Nunn

(10) Patent No.: US 10,769,718 B1
(45) Date of Patent: Sep. 8, 2020

(54) METHOD, MEDIUM, AND SYSTEM FOR LIVE PREVIEW VIA MACHINE LEARNING MODELS

(71) Applicant: Nicom Living LLC, Tampa, FL (US)

(72) Inventor: Daniel James Nunn, Tampa, FL (US)

(73) Assignee: Nicom Living LLC, Tampa, FL (US)

(*) Notice: Subject to any disclaimer, the term of this patent is extended or adjusted under 35 U.S.C. 154(b) by 0 days.

(21) Appl. No.: 16/794,877

(22) Filed: Feb. 19, 2020

(51) Int. Cl.
| | |
|---|---|
| *G06Q 30/00* | (2012.01) |
| *G06Q 30/06* | (2012.01) |
| *G06T 7/194* | (2017.01) |
| *G06N 20/00* | (2019.01) |
| *G06T 5/50* | (2006.01) |
| *G06K 9/62* | (2006.01) |

(52) U.S. Cl.
CPC ....... *G06Q 30/0643* (2013.01); *G06K 9/6267* (2013.01); *G06N 20/00* (2019.01); *G06T 5/50* (2013.01); *G06T 7/194* (2017.01); *G06T 2207/20081* (2013.01); *G06T 2207/20084* (2013.01); *G06T 2207/20221* (2013.01)

(58) Field of Classification Search
CPC . G06T 2207/20081; G06T 2207/20084; G06T 2207/20221; G06T 2207/20212; G06T 7/194; G06T 5/50; G06Q 30/0643; G06N 20/00; G06K 9/6267
See application file for complete search history.

(56) References Cited

U.S. PATENT DOCUMENTS

| | | | | |
|---|---|---|---|---|
| 5,575,936 A | * | 11/1996 | Goldfarb | B23K 26/067 219/121.68 |
| 6,605,797 B1 | * | 8/2003 | Troitski | B23K 26/0604 219/121.69 |
| 8,150,145 B2 | * | 4/2012 | Lemelin | G06Q 30/00 382/154 |
| 2006/0188145 A1 | * | 8/2006 | Song | B33Y 30/00 382/154 |

OTHER PUBLICATIONS https://web.archive.org/web/20190415235737/https://cockpit3d.com/threedservices (Year: 2019).*

* cited by examiner

*Primary Examiner* — Matthew E Zimmerman
(74) *Attorney, Agent, or Firm* — Platinum Intellectual Property LLP

(57) ABSTRACT

Machine learning-based approaches are used to create instances or visualizations of content appearing within an object in an image. For example, a user may submit a request for a preview or visualization of content within an object or other media such as a glass crystal. A trained model can process the content to generate adjustment data or other data that can be used to control image blending operations. The adjustment data can be applied to the pixel values of the content to modify the content in order to enable a visualization of the content within an object. The image portion can be modified such that the object appears to "blend" with and appear within the object. Image transformation techniques can be used to project the modified content onto a (Continued)

representation of an object. Thereafter, a visualization or preview of the content within the representation of the object can be presented.

18 Claims, 14 Drawing Sheets

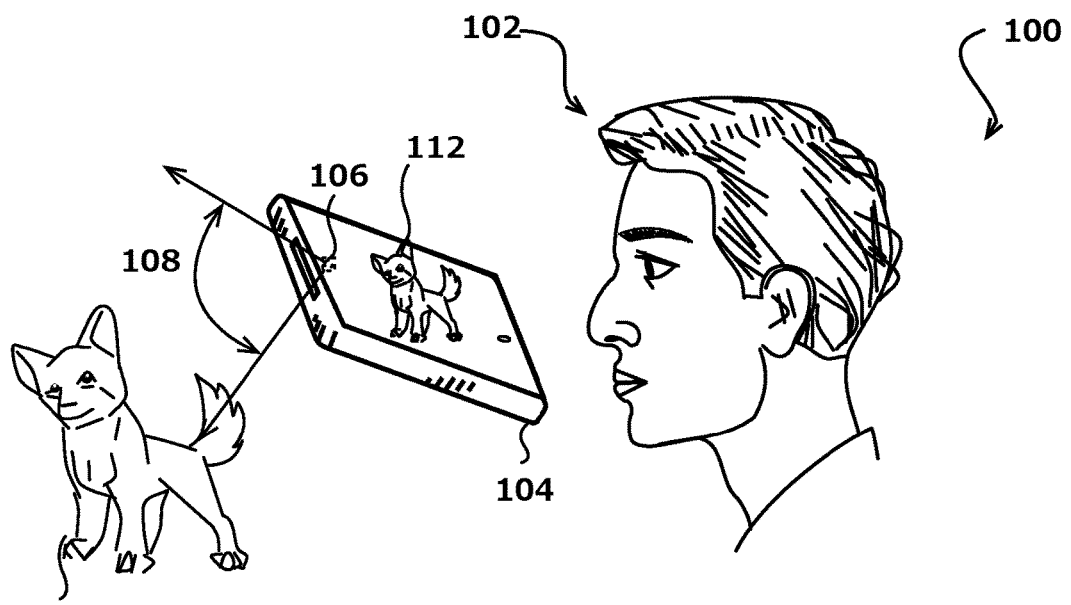
FIG. 1A
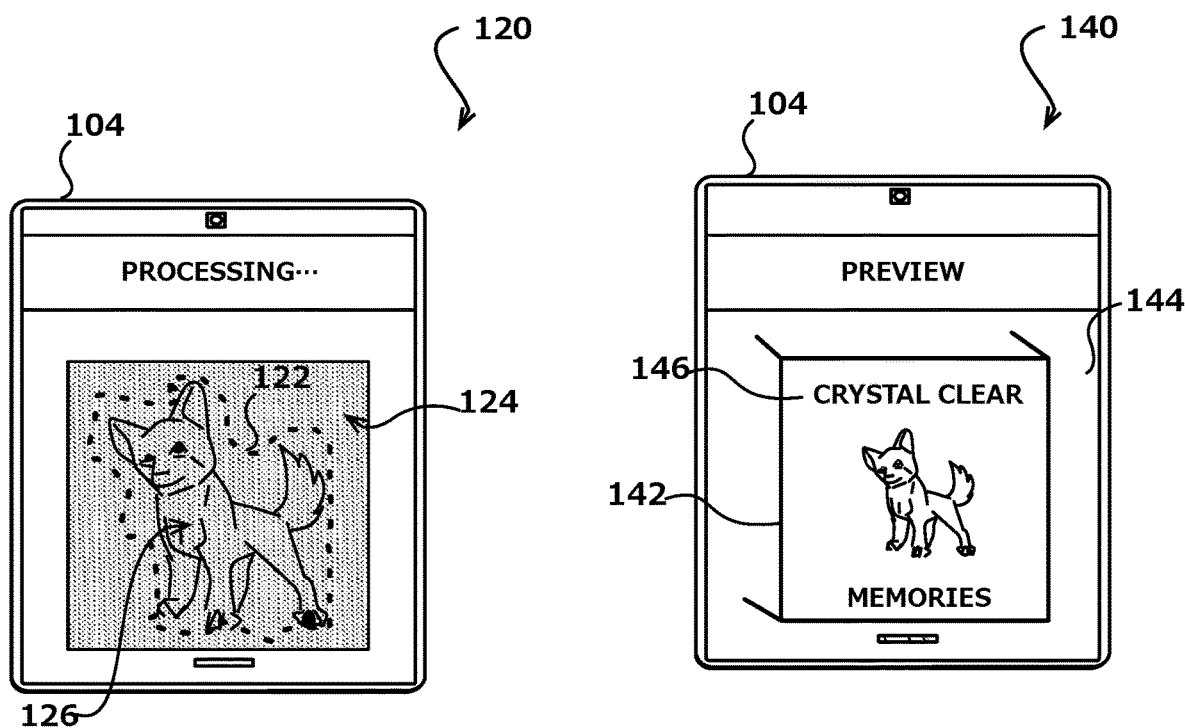
FIG. 1B
FIG. 1C

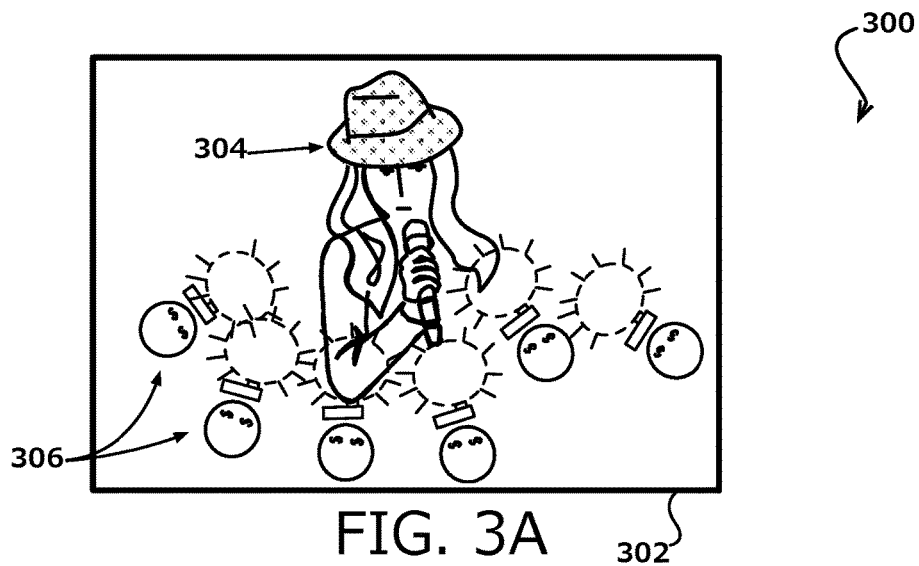
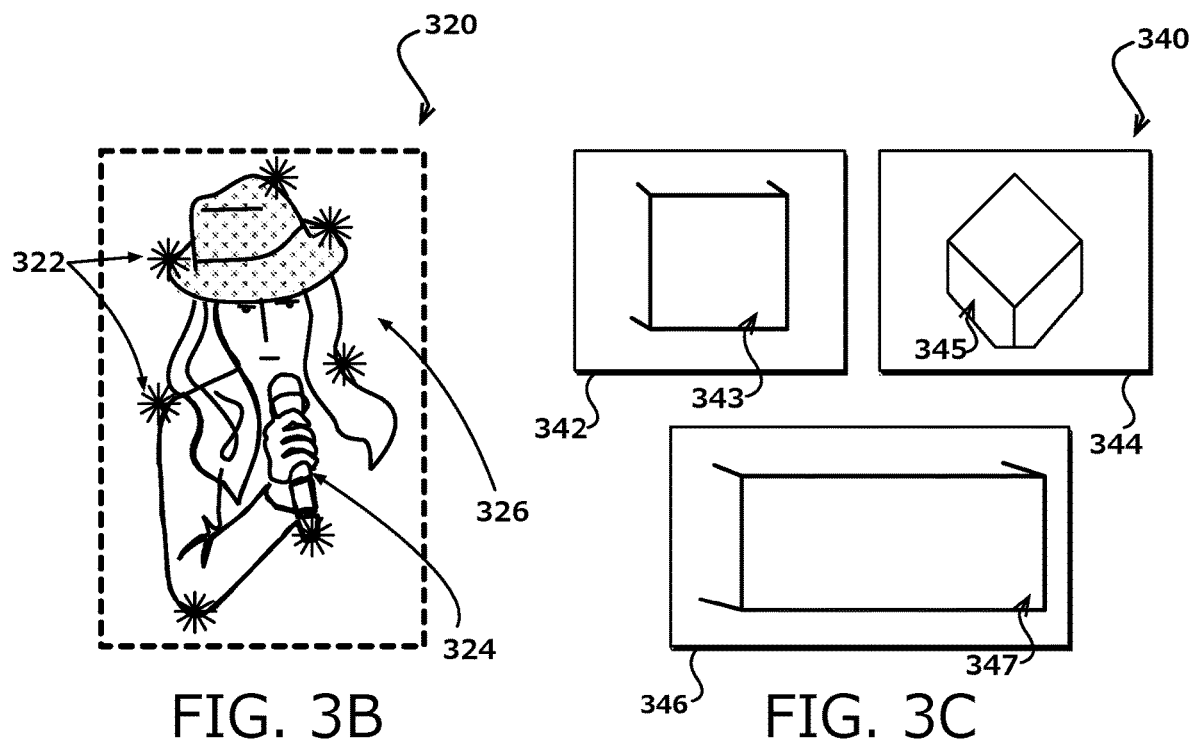

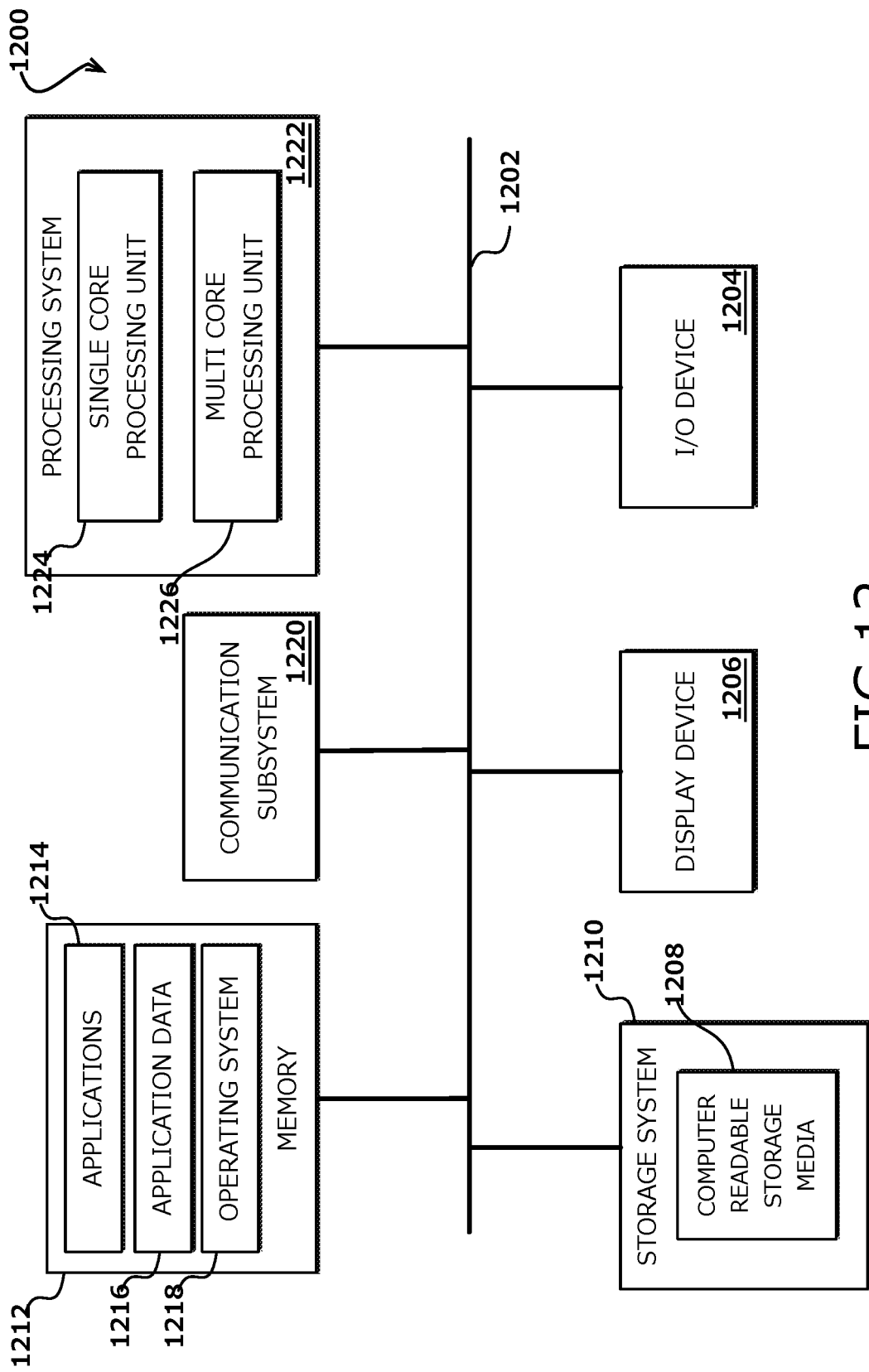

METHOD, MEDIUM, AND SYSTEM FOR LIVE PREVIEW VIA MACHINE LEARNING MODELS

BACKGROUND

As the number of services and products offered to customers increases, there is a corresponding increase in the need to efficiently interact with those customers. For example, a company may sell items such as glass crystals or other objects that include images or other content that appear within the glass crystals. Before purchasing such a product, customers may desire a preview of the product, such as a preview of content engraved in the glass crystals. In conventional approaches, a company may utilize an artist and image manipulations tools to provide a mockup of the product. These tools can include the ability to blend images, digitally draw or paint an image, crop, size, copy and paste image content into an image, apply filters or masks, among other such image modification techniques. However, such aa approach relies upon an artist to manually create the preview, which can be a complicated and time-consuming endeavor, and subject to user errors with respect to filtering, positioning, and masking a foreground image and a background image. As such, a customer may not proceed with the purchase of the product, costing the company time and money. Further, companies may have to employ one or more artists to create previews, which can be expensive. Accordingly, it is desirable to provide improved techniques for generating digital content.

BRIEF DESCRIPTION OF THE DRAWINGS

Various embodiments in accordance with the present disclosure will be described with reference to the drawings, in which:

FIGS. 1A, 1B, and 1C illustrate an example approach to generating images that can be utilized in accordance with various embodiments;

FIGS. 3A, 3B, 3C, 3D, and 3E illustrate an example approach to modifying images or creating instances or visualizations of content appearing in substantially transparent media in accordance with various embodiments;

FIG. 12 illustrates a set of basic components of an electronic computing device, such as the one illustrated in FIGS. 11A and 11B.

DETAILED DESCRIPTION

Figure 2:
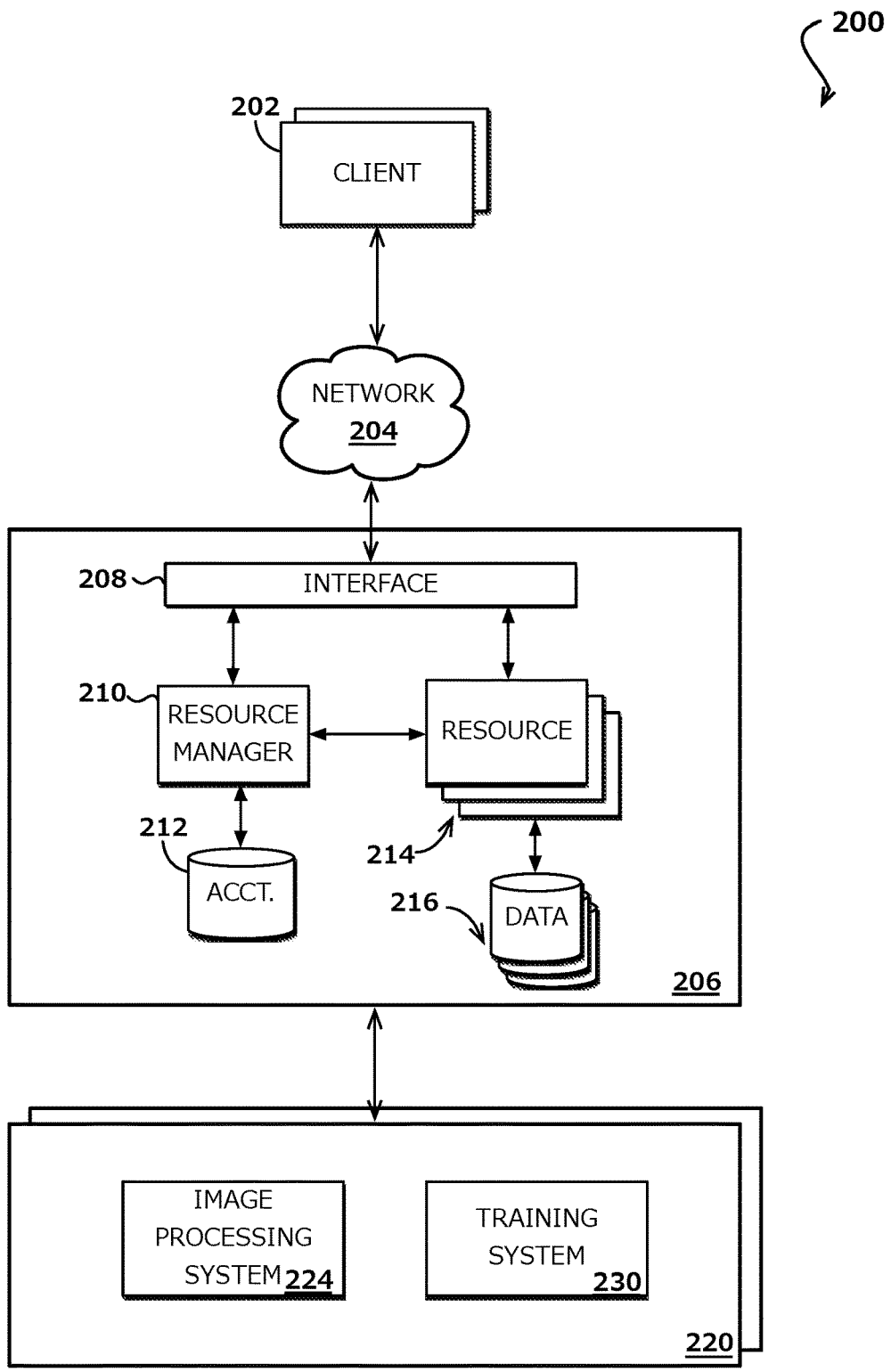
FIG. 2 illustrates an example environment in which aspects of the various embodiments can be implemented.

Systems and methods in accordance with various embodiments of the present disclosure may overcome one or more of the aforementioned and other deficiencies experienced in conventional approaches to generating digital content. In particular, various embodiments describe machine learning-based approaches for modifying images and/or creating instances or visualizations of content with (e.g., appearing within or in certain embodiments on a surface of) one or more objects in an image.

For example, a user may submit a request for a preview or visualization of content appearing within an object, such as a three-dimensional glass crystal. The request can be associated with an image that includes the content. The image can be analyzed to determine a portion of the image that contains the appropriate material, while in certain embodiments, the user may indicate the desired portion. In various embodiments, the content may be considered part of a foreground image portion of the image, where the foreground image portion may correspond to an area of interest or subject such as, for example, one or more persons, object(s), animal(s), nature, structures, event(s), building(s), vehicle(s), geography, product(s), among other items, events, etc.

A trained model (e.g., an image adjustment model such as a neural network or another machine learning-based model) can process the foreground image portion to generate adjustment data or other data that can be used to control image modifications operations. In at least some embodiments, the model can be trained using sets of images for specific classifications of content modified to appear as though it were engraved within objects and/or on the surface of objects. For example, a neural network might be trained using a set of images (i.e., hundreds or thousands in some cases) of content appearing engraved within or on different objects, such that when a query image including content to appear with (e.g., appearing within or in certain embodiments on a surface of) a particular object is received, the content can be quickly identified based on aspects (i.e., feature points or contours) in the image that correspond to similar aspects of the trained neural network for content appearing with similar objects. Through the training, each trained neural network can generate adjustment data or a data set that is "representative" of content within a particular class of objects, in that it includes data that corresponds to analysis of many images of content modified to appear within or in certain embodiments on a surface of objects of that type and can be used to generate adjustment data to modify content to appear with objects of that type with similar aspects.

The adjustment data can be applied to the pixel values of the content to modify the content in order to enable a visualization of the content with (e.g., appearing within or in certain embodiments on a surface of) an object. The image portion can be modified such that the object appears to "blend" and appear with (e.g., appearing within or in certain embodiments on a surface of) the object, with the pixel values for the content being directly modified, added to, or otherwise averaged or mixed with, in certain embodiments, the pixel values for the corresponding pixel locations of the object. In at least some embodiments, an object classification can correspond to the adjustment data, and the gradient of an image patch for that classification can be added to, or blended with, the pixel values of the content represented in the foreground image portion in order to enable a visualization of the content with the object.

Image transformation techniques can be used to project the modified foreground image portion to the object represented in an image template. Thereafter, a visualization or preview of the content with (e.g., appearing within or in certain embodiments on a surface of) the representation of the object can be presented. Such an approach can be used to add objects to existing images or create new images, among other such options.

Instructions for causing a computer system to modify images or create instances or visualizations of one or more objects in an image in accordance with the present disclosure may be embodied on a computer-readable medium. For example, in accordance with an embodiment, a backend system may train image adjustment models to process image data to generate adjustment data or other data that controls image modification operations. In an embodiment, the adjustment data can be applied to pixel values of content such that the content is modified to appear as though it were within or in certain embodiments on a surface of an object. Thereafter, a visualization or preview of the content with (e.g., appearing within or in certain embodiments on a surface of) the object can be presented. Such an approach can be used to add objects to existing images or create new images, among other such options. Advantageously, instead of using a manual image editing approach, or scripts to automate manual tasks, embodiments described herein use trained models (e.g., trained neural network models) to automatically analyze image content from foreground and background images to generate adjustment data to optimally blend an object of interest from the foreground image with a target background region of the background image.

It should be noted that although the techniques described herein may be used to provide a preview of content in a wide variety of objects, for clarity of presentation, the objects described herein generally relate to photo frames. The techniques described herein, however, are not limited to laser-engraved glass crystals, and other objects such as lenses, prisms, decorative lighting, plaques, trophies, awards, windows, stemware, serveware, barware, glasses, etc. may be used. It should be further noted that the material of the objects can include crystal, acrylic, glass, polycarbonate, lucite, or other such material. Various other functions and advantages are described and suggested below as may be provided in accordance with the various embodiments.

FIGS. 1A, 1B, and 1C illustrate an example approach to generating images that can be utilized in accordance with various embodiments. It should be understood that reference numbers are carried over between figures for similar components for purposes of simplicity of explanation, but such usage should not be construed as a limitation on the various embodiments unless otherwise stated. FIG. 1A illustrates example 100 of a user 102 interacting with a computing device 104. Although a portable computing device (e.g., a smartphone, an e-book reader, or tablet computer) is shown, it should be understood that various other types of electronic devices that are capable of capturing and processing image data can be used in accordance with various embodiments discussed herein. These devices can include, for example, desktop computers, notebook computers, personal data assistants, cellular phones, video gaming consoles or controllers, smart televisions, wearable computers (e.g., smartwatches or glasses), and portable media players, among others.

In this example, the computing device 104 includes at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology.

In accordance with various embodiments, user 102 is interested in capturing an image of a particular subject (e.g., dog 110) that is to be engraved in an object such as a three-dimensional glass crystal or other transparent (e.g., optically clear) or partially transparent object. Before submitting an order for such a product, however, the user may desire a mockup of the object (e.g., glass crystal) engraved with dog 110. In accordance with various embodiments, the object can include, for example, photo/picture frames, lenses, prisms, decorative lighting, plaques, trophies, awards, windows, stemware, serveware, barware, glasses, etc. The material of the object can include, for example, crystal, acrylic, glass, polycarbonate, lucite, or other such material or optically clear substance. The shape and size of the object can be any one of a number of three-dimensional shapes and sizes. Methods for engraving two-dimensional content in three-dimensional objects are known in the art, such that detailed description of the entire process, and explanation of all possible components, will not be discussed in detail herein.

User 102 may submit a request for a preview or visualization of dog 110 appearing with (e.g., appearing within or in certain embodiments on a surface of) an object. The request can include or be associated with image 112 of dog 110, as well as related information. The request can be received at an application, function, and/or system such as a content provider for processing image 112. In an embodiment, in order to obtain the image, the user can position the computing device 104 such that at least the relevant portion of the dog 110 is within a field of view 108 of at least one image capture element 106 of the computing device. The resulting image can be displayed on a display screen of the computing device, as illustrated in example 100 of FIG. 1A.

In various embodiments, the image 112 of the dog can be a still image that was captured by the camera or can be a frame of a "live" view as captured by a video mode of the camera, etc.

In certain embodiments, the image may have been previously obtained, and may be stored on the computing device and/or remote the computing device, and can be provided to (e.g., uploaded, transmitted, etc.) to an appropriate application, function, and/or system.

In any situation, each instance of captured information can be referred to as an "object," which can be analyzed by software running on or remote from the device. In this example, the objects that can be recognized from the image can include objects such as faces, landmarks, geographic areas, people, animals, etc. Various other types of objects can be detected in other examples, as discussed and suggested elsewhere herein. In certain embodiments, the user may select the desired objects. This can include, for example, tapping an area of the display screen that presents one or more desired objects, using a finger or object (e.g., stylus) to draw a bounding box or other indication to select one or more desired objects, moving a selection area across an image in an image editing program, for example, such as by dragging a finger across a touch screen or moving a mouse cursor or other such element as known in the art for image manipulation and other such purposes. In various embodiments, the image can be processed to attempt to determine other objects of interest, which then can be utilized by the user for any of a number of different purposes, as will be described elsewhere herein.

For example, FIG. 1B illustrates example 120, where image 112 is analyzed to detect a foreground image portion 122 and a background portion 124. The foreground image portion(s) can include desired content 126 of one or more subjects (and any desired objects associated with the subject, e.g., a dog house the dog is lying in), such as dog 110, and the background portion(s) can include most everything else not to be engraved in the object or at least a threshold amount of the remaining image. The foreground image portion can be used to select a template image that includes a representation of an object for which the foreground image portion is to be blended with, such as a representation of a glass crystal, as illustrated in example 140 of FIG. 3C. There can be multiple template images, and each template image can include a representation of a different object. It should be noted that the label object representation in various embodiments can be used interchangeably with the label a representation of an object. It should be further noted that an object represented in image data can be one of a plurality of object types, where each object type can be associated with a shape, classification, trained model, and other characteristics.

Once the portion of the image that includes desired content 126 is determined, a template image can be selected based on one or more characteristics of the foreground image portion that includes the desired content, such as size and shape on the image portion, the number of entities or objects in the image portion, etc. In at least some embodiments, a template image can be selected using models trained on user-selected and other generated objects with (e.g., appearing within or in certain embodiments on a surface of) objects. In various embodiments, a user can select and/or switch between template images.

A trained model (e.g., an image adjustment model such as a neural network or another machine learning-based model) on the computing device 104 or in certain embodiments remote the computing device 104 can process content 126 represented in foreground image portion 122 to generate adjustment data or other data that can be used to control image modification operations. In an embodiment, the adjustment data can be applied to the pixel values of content 126 to modify content 126 in order to enable a visualization of content 126 with (e.g., appearing within or in certain embodiments on a surface of) object representation 142, as illustrated in example 140 of FIG. 1C. In at least some embodiments, the image portion can be modified such that content 126 appears to "blend" and appear within (or on a surface of) object representation 142, with the pixel values for the content being directly modified, added to, and/or otherwise averaged or mixed with, in certain embodiments, the pixel values for the corresponding pixel locations of object representation 142. In some embodiments, the amount by which pixel values of content 126 modify the pixel values of object representation 142 can be adjustable, and at least some amount of anti-aliasing of the surrounding pixels can be utilized as well in at least some embodiments. Image transformation techniques can be used to project the modified content onto the object representation. Thereafter, a visualization or preview 144 of content 126 appearing with (e.g., appearing within or in certain embodiments on a surface of) object representation 142 can be presented, along with additional information such as text 146.

Using a conventional approach, the user may utilize one or more image analysis techniques to generate a mockup of the dog with (e.g., appearing within or in certain embodiments on a surface of) the object. The image analysis techniques can include the ability to blend portions of images with other images, digitally draw or paint an image, copy and paste image content into an image, among other such techniques. However, such as approach relies upon the user to manually create the preview, which can be a complicated and time-consuming endeavor, and subject to user errors with respect to filtering, positioning, and masking an image with another image. In certain situations, a company may employ one or more artists to create a mockup of the dog with (e.g., appearing within or in certain embodiments on a surface of) the glass crystal. However, this can be expensive and time-consuming. Further, the user has to wait for the image to be uploaded and processed before determining whether the user wants to purchase a laser-engraved or other etched, engraved, or modified glass crystal that includes a representation of the dog. If the user does not like the mockup, the user must cause another image to be processed and hope that the desired result is returned. This process can be inefficient and potentially frustrating to a user. Accordingly, approaches in accordance with various embodiments provide for processing image 112 to display a preview of dog 110 or other objects of interest engraved in an object such as a glass crystal. The preview can provide a realistic view of a physical glass crystal that includes an engraving of the dog.

It should be noted that although FIGS. 1A, 1B, and 1C describe a preview of a dog engraved in a glass crystal, techniques herein may be used to provide a preview of content in a wide variety of objects, and the example provided is for clarity of presentation.

FIG. 2 illustrates an example environment 200 in which aspects of the various embodiments can be implemented. In this example, a user can utilize a client device 202 to communicate across at least one network 204 with a resource provider environment 206. The client device 202 can include any appropriate electronic device operable to send and receive requests, messages, or other such information over an appropriate network and convey information back to a user of the device. Examples of such client devices 202 include personal computers, tablet computers, smartphones, notebook computers, and the like. The user can include a person authorized to manage the aspects of the resource provider environment.

The resource provider environment 206 can provide image processing services and the like. These services can include, for example, filtering images, positioning images, masking images, blending images, cropping images, color balancing images, identifying objects represented in images, determining foreground and background image regions, etc.

The network(s) 204 can include any appropriate network, including an intranet, the Internet, a cellular network, a local area network (LAN), or any other such network or combination, and communication over the network can be enabled via wired and/or wireless connections.

The resource provider environment 206 can include any appropriate components for receiving requests and returning information or performing actions in response to those requests. As an example, resource provider environment 206 might include Web servers and/or application servers for receiving and processing requests, then returning previews of images or other content that appear with (e.g., appearing within or in certain embodiments on a surface of) objects, Web pages, video, audio, or other such content or information in response to the request. While this example is discussed with respect to the internet, web services, and internet-based technology, it should be understood that aspects of the various embodiments can be used with any appropriate services available or offered over a network in an electronic environment.

In various embodiments, resource provider environment 206 may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. Methods for enabling a user to reserve various resources and resource instances are well known in the art, such that a detailed description of the entire process, and explanation of all possible components, will not be discussed in detail herein. In this example, resource provider environment 206 includes a plurality of resources 214 of one or more types. These types can include, for example, application servers operable to process instructions provided by a user or database servers operable to process data stored in one or more datastores 216 in response to a user request.

In various embodiments, resource provider environment 206 may include various types of resources that can be utilized for processing image data. In this example, resource provider environment 206 includes image processing system 224 and training system 230 operable to utilize machine learning-based approaches to modify images or create instances or visualizations of one or more objects in an image. The systems may be hosted on multiple server computers and/or distributed across multiple systems. Additionally, the systems may be implemented using any number of different computers and/or systems. Thus, the systems may be separated into multiple services and/or over multiple different systems to perform the functionality described herein.

In various embodiments, the resources 214 can take the form of servers (e.g., application servers or data servers) and/or components installed in those servers and/or various other computing assets. In some embodiments, at least a portion of the resources can be "virtual" resources supported by these and/or components. While various examples are presented with respect to shared and/or dedicated access to disk, data storage, hosts, and peripheral devices, it should be understood that any appropriate resource can be used within the scope of the various embodiments for any appropriate purpose, and any appropriate parameter of a resource can be monitored and used in configuration deployments.

In at least some embodiments, an application executing on the client device 202 that needs to access resources of the provider environment 206, for example, to manage image processing system 224 and/or training system 230, implemented as one or more services to which the application has subscribed, can submit a request that is received to interface layer 208 of the provider environment 206. The interface layer 208 can include application programming interfaces (APIs) or other exposed interfaces, enabling a user to submit requests, such as Web service requests, to the provider environment 206. Interface layer 208, in this example, can also include a scalable set of customer-facing servers that can provide the various APIs and return the appropriate responses based on the API specifications. Interface layer 208 also can include at least one API service layer that, in one embodiment, consists of stateless, replicated servers that process the externally-facing customer APIs. The interface layer can be responsible for Web service front-end features such as authenticating customers based on credentials, authorizing the customer, throttling customer requests to the API servers, validating user input, and marshaling or un-marshaling requests and responses. The API layer also can be responsible for reading and writing database configuration data to/from the administration datastore, in response to the API calls. In many embodiments, the Web services layer and/or API service layer will be the only externally visible component or the only component that is visible to and accessible by customers of the control service. The servers of the Web services layer can be stateless and scaled horizontally, as known in the art. API servers, as well as the persistent datastore, can be spread across multiple data centers in a region, for example, such that the servers are resilient to single data center failures.

When a request to access a resource is received at the interface layer 208 in some embodiments, information for the request can be directed to resource manager 210 or other such systems, service, or component configured to manage user accounts and information, resource provisioning and usage, and other such aspects. Resource manager 210 can perform tasks such as to communicate the request to a management component or other control component which can manage distribution of configuration information, configuration information updates, or other information for host machines, servers, or other such computing devices or assets in a network environment, authenticate an identity of the user submitting the request, as well as to determine whether that user has an existing account with the resource provider, where the account data may be stored in at least one datastore 212 in the resource provider environment 206. The resource manager can, in some embodiments, authenticate the user in accordance with embodiments described herein based on voice data provided by the user.

A host machine 220 in at least one embodiment can host the image processing system 224 and training system 230. As will be described further herein, image processing system 224 and training system 230 can utilize a machine learning-based approach to modify images or create instances or visualizations of one or more objects in an image. It should be noted that although host machine 220 is shown outside the provider environment, in accordance with various embodiments, image processing system 224 and training system 230 can both be included in provider environment 206, while in other embodiments, one or the other can be included in the provider environment. In various embodiments, one or more host machines can be instantiated to host such systems for third-parties, additional processing of preview requests, and the like.

FIGS. 3A, 3B, 3C, 3D, and 3E illustrate an example approach to modifying images or creating instances or visualizations of content appearing in substantially transparent media in accordance with various embodiments. As illustrated in example situation 300 of FIG. 3A, image 302 is obtained. The image can be obtained at a user device or a server remote the user device. In this example, image 302 includes performer 304 performing at a concert, fans or crowd 306, and various other objects and artifacts such as cameras, flash photography, etc.

In order to determine the number and location of subjects represented in image 302 or other desired content, it can be desirable in at least some embodiments to identify the portions of the image that correspond to those objects. This can involve any of a number of segmentation processes, which can be performed manually or automatically in various embodiments. In a manual process, a person can cut, crop, or otherwise specify portions of an image that correspond to different areas of interest and desired content (e.g., representation of performer 304), such as foreground image portion 324.

In other embodiments, an automatic segmentation process can be used to analyze the various images and attempt to segment the image into portions corresponding to areas of the image. A first step of such an approach can involve removing background portions 326 of the image or otherwise removing from consideration any portions of the image that do not correspond to an area of interest, in order to improve the accuracy of the results and lessen the amount of data to be analyzed. A cropping process can begin by starting at the corners and/or edges of the image and moving each side of a rectangle inward until an edge or portion of a contour of an object is detected. In some instances, the background color will be known such that the process can move inward until a region with a color other than the background is determined. In other embodiments, the background color may need to be determined, or background objects in the image removed using any appropriate process known or used for such purposes in other image-related processes. After each edge has stopped at an edge or contour of an object, a bound region of the image will be determined that will include the item of interest. The image in some embodiments can then be cropped to this region, such that the background pixels previously located outside this region in the image are removed from the image file.

In at least some embodiments, a different approach can be taken to attempt to determine the region corresponding to the area of interest versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered potential objects(s) of interest. In an example situation, an outline or mask region can be determined that then corresponds to the foreground (or background) portion of the image. This can be used to crop or select the image region based on the location of the object or can be used to expand the object to the appropriate aspect ratio, as discussed elsewhere herein.

If the image includes multiple areas of interest (or objects), the connected components analysis can still connect the background regions, which can result in determining a second object region in the image. Various approaches can then either consider these objects together or as separate objects for purposes of cropping or image match. For images with multiple such object regions, one or more rules or policies could be utilized that indicate to select only the top region, most central region, the largest region, etc.

In certain embodiments, feature extraction techniques can extract features 322 of image 302, as illustrated in example 320 of FIG. 3B. Features 322 can define characteristics of image 302 or segments of image 302 and can be used to detect portions of an image that correspond to different areas of interest, such as foreground image portion 324.

Once the foreground image portion(s) that include the desired content is detected, a template image for which the foreground image portion is to be blended can be determined or otherwise selected. Example 340 of FIG. 3C illustrates example template images 342, 344, and 346. In an embodiment, a template image can be associated with different types of information. For example, a template image can be associated with information for a particular object for which content is to be engraved or otherwise displayed with (e.g., appearing within or in certain embodiments on a surface of). For example, template image 342 includes a representation of an object shaped like cube 343, template image 344 includes a representation of an object shaped like cube 345 at a different orientation than cube 343, and template image 346 includes a representation of an object shaped like a brick (e.g., three-dimensional rectangle) 347. In accordance with various embodiments, the representation of the objects corresponds to physical objects that can be engraved with user content. It should be noted that although object representations 343, 345, and 347 are shown, the techniques described herein are not limited to these object representations, and the other object representations of different shapes may be used in accordance with the various embodiments described herein.

In an embodiment, a template image can be a multi-layer TIFF file. It should be noted, however, that the template image can be organized in any one of a plurality of different data structures, and be associated with any number characteristics. For example, a template image may be associated with information for an object representation. In another example, a template image may be associated with one or more image transformations. In yet another example, a template image may be associated with reflection data, opacity/transparency data, and other data for image properties.

The transformations can include, for example, transformation of the foreground image portion(s) as they are to be projected onto an object representation. It should be noted that any one of a number of image transformation techniques can be utilized in accordance with embodiments described herein. In an embodiment, a first transformation can project the foreground image portion (or mock engraving) to the object representation. A second transformation and other transformations can project mock reflections to the object representation. As is known in the art, such transformation can be applied using a number of different approaches. In certain embodiments, when applying the second and other transformations, these transformations can be applied similarly to the first transformation with the addition of blur, color, transparency, etc. image modification techniques. In a nonlimiting example, individual transformations can be described by at least two consecutive layers of a multi-layer TIFF template. The first layer of the two-layer sequence can be a 4-corner polygon which can describe the mapping between the input image (e.g., foreground image portion) and the projected image (e.g., object representation). The image can be transformed so that the top-left corner of the input image corresponds to the top-left corner of the polygon, and so on. In some embodiments, the top left corner of the polygon may be specified manually by drawing a small circle marker close to the corresponding corner of the polygon. The second layer of the two-layer sequence can be a transparency mask that is applied onto the transformed image. The template file may also contain XMP metadata or other associated data, which can set parameters of the template. These templates may have a command line-like interface, such as: --aspect-ratio <RATIO>-set the template's front aspect ratio --min-text-len<EMs>-set the minimum text width in Ems, for example. In the situation where the text's width when rendered is less than a threshold, the text can be padded with spaces --fit-to-mask-fit the front transformation to the mask for non-convex template shapes. In convex mode, the image can be projected so that each corner of the input image maps to the corresponding polygon corners. In fit-to-mask mode, several scales and translations of the input image can be attempted to determine which configuration would occupy the maximum area without going outside of the transparency mask.

A template image can be selected by the user in at least some embodiments. For example, a user can select from a group of available template images, where each template image includes an object that corresponds to a physical object for which desired content is to be engraved. The template images may be presented and/or organized by category, size, occasion, price, and the like. In certain embodiments, a template image can be recommended to the user. For example, based on the one or more characteristics of the desired content, such as size, shape, number of subjects, number of faces or persons, number of objects, types of objects or subjects, etc., a template image can be selected that optimally fits and blends with the content. In certain embodiments, a template image can be selected using models trained on historical user-selected templates. For example, one or more feature extraction techniques can be used to detect and define characteristics of past user-selected templates and the objects displayed therein. The characteristics, or feature descriptors or signatures can be global, i.e., represent the entire image, or local, i.e., describe discrete portions of an image. Image features may be extracted globally or locally according to texture, shape, other salient features, or some combination thereof. Once the features for a user-submitted image have been extracted and defined, various feature matching methods can be used to assess the similarity between the user-submitted image and past images and templates. Similarity (or distance) measures will depend on the feature descriptors selected for extraction from an image. In various embodiments, a user can select and/or switch between template images.

A trained model (e.g., an image adjustment model such as a neural network or another machine learning-based model) can process the foreground image portion to generate adjustment data or other data that controls image modification operations. In at least some embodiments, the neural network will be trained using sets of images for specific classifications of content modified to appear as though it were engraved within or in certain embodiments on a surface of objects. In various embodiments, the representation of the content is the content modified to appear as though it were engraved within or on a surface of an object, and no object is included in the representation. In this example, the modified content is separate from, for example, a representation of an object with the content appearing within or on a surface of the object. In certain embodiments, the sets of images include a representation of an object with content modified to appear within or on a surface of the object. In any situation, content modified to appear within or on a surface of an object can include content modified to appear laser engraved, etched, etc. within or on a surface of an object. In accordance with an embodiment, a neural network might be trained using a set of images (i.e., hundreds or thousands in some cases) of content appearing engraved or otherwise appearing within (or on a surface of) different objects, such that when a query image including content to appear with (e.g., appearing within or in certain embodiments on a surface of) a particular object is received, the content can be quickly identified based on aspects (i.e., feature points or contours) in the image that correspond to similar aspects of the trained neural network for content appearing within (or on a surface of) similar objects. Through the training, each trained neural network will generate adjustment data or a data set that is "representative" of content within (or on a surface of) the particular class of objects, in that it includes data that corresponds to analysis of many images of content with (e.g., appearing within or in certain embodiments on a surface of) objects of that type and can be used to generate adjustment data to modify content to appear within (or on a surface of) objects of that type with similar aspects.

In the situation template image 344 is selected, the adjustment data can be applied to the pixel values of foreground image portion 324 to modify the foreground image portion 324 in order to enable a visualization of the content with object representation 345. The image portion can be modified such that the portion appears to "blend" and appear within (or on a surface of) object 345, with the pixel values for the content being directly modified, added to, or otherwise averaged or mixed with, in certain embodiments, the pixel values for the corresponding pixel locations of object 345. In at least some embodiments, an object classification can correspond to the adjustment data, and the gradient of an image patch for that classification can be added to, or blended with, the pixel values of the content represented in foreground image portion 324 in order to enable a visualization of the content within (or on a surface of) object representation 345.

Image transformation techniques can be used to project the modified foreground image portion onto object representation 345. In various embodiments, foreground image portion can be projected onto a default target region or other appropriate areas within (or on a surface of) object representation 345. In various embodiments, a user can adjust a location and/or orientation of foreground image portion 324 within the target region. For example, a user can be provided a graphical user interface that allows the user to move the content (e.g., foreground image portion) around and within (or on a surface of) object representation 345. The user may be able to utilize one or more gestures to move and adjust a size/magnification of the content. One or more graphical elements or text corresponding to input controls can be used to adjust a position and/or size of the content within (or on a surface of) object representation 345. In certain embodiments, due to the characteristics of the physical object for which the content (e.g., foreground image portion) and additional content is to be engraved or otherwise displayed in, one or more restrictions may limit the position and/or orientation of content displayed within (or on a surface of) object representation 345. For example, due to technical limitations of engraving particular material, content may not be positioned at or appropriate certain edges or corners. In another example, text may be limited to at least a threshold size and font.

Figure 3D:
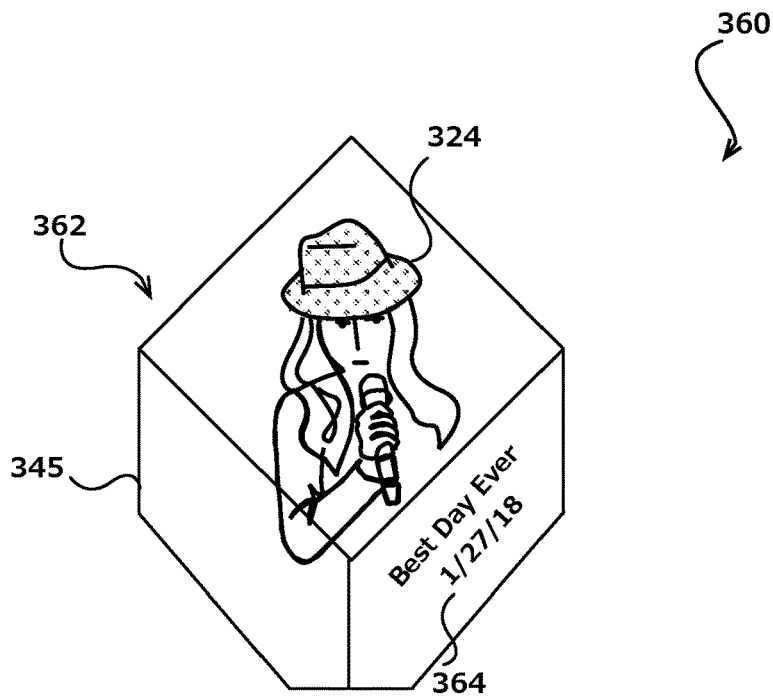
Figure 3E:
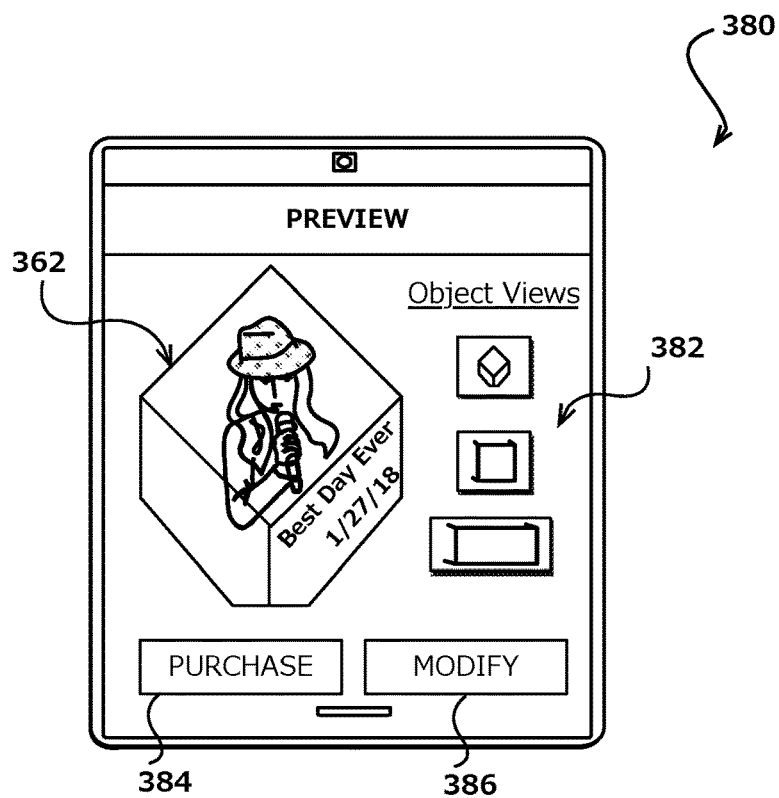

An image 362 that includes foreground image portion 324 (e.g., the performer) appearing engraved within (or on a surface of) object representation 345 (e.g., glass crystal) can be presented, as illustrated in example 360 of FIG. 3D. The user, in some embodiments, may add text 364, logos, or other content using an appropriate input approach such as typing, speech-to-text, etc., that may also appear engraved with the content. Additionally, or alternatively, the user can select different object representations with the content for preview by selecting a different object representation from available objects 382. For example, a user can touch a touch screen, click a mouse button, or provide another selection input that can select a different object representation to appear engraved with user content, as illustrated in example 380 of FIG. 3E. In this way, a user can be confident about the product before purchase. The user then can have options such as to view more information for the product, purchase the product 384, modify the preview of the product 386, visit a site offering the product, etc.

Figure 4:
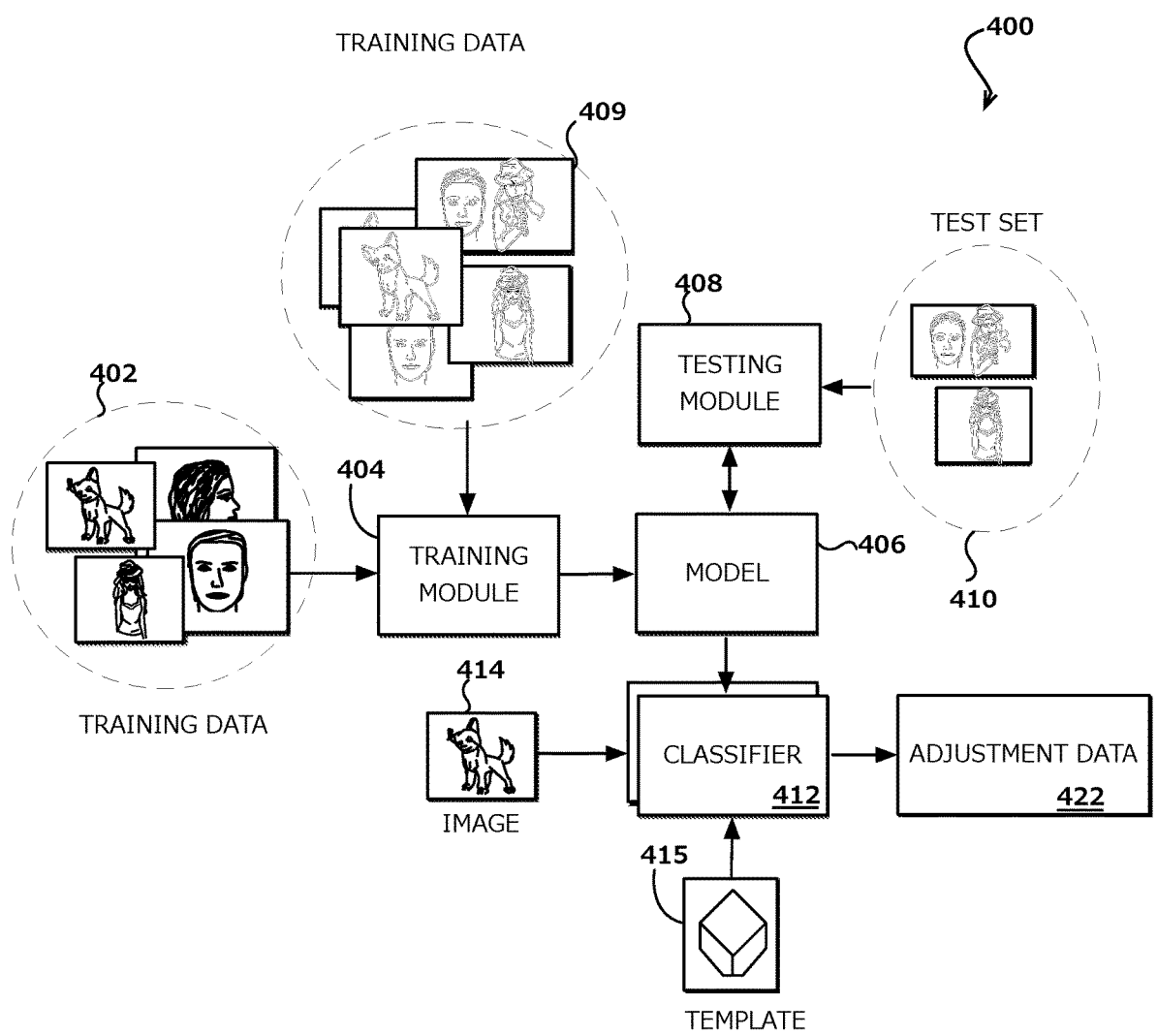
FIG. 4 illustrates an example classification pipeline that can be utilized in accordance with various embodiments.

As described herein, a trained model (e.g., an image adjustment model such as a neural network or another machine learning-based model) can process images to generate adjustment data or other data that can be used to control image modification operations. FIG. 4 illustrates an example classification pipeline 400 that can be utilized in accordance with various embodiments. In this example, images are obtained that can be used as training data to train model 406. In an embodiment, training data 402 and 409 can include images of content and images of content modified to appear as though it were engraved or otherwise within objects and/or on the surface of objects (e.g., glass crystals). The content can include, for example, a subject and/or area of interest of an image. Example subjects include people, animals, objects, etc. An area of interest can correspond to a user-selected area of the image.

In an embodiment, training data 402 includes input images, and training data 409 includes output images. An input image includes a representation of content to be engraved. An output image includes a representation of the content appearing as though it were engraved, etched, printed, etc. within (or on a surface of) an object. Mapping information, a lookup table, or other information can be used to associate images in training data 402 to images in training data 409.

In order to function as training data for one or more models (e.g., a neural network or other machine learning-based model), at least some of the images can include (or be associated with) data that indicates a label, type, or classification of the images. The classifications in at least some embodiments can be selected from a set of classifications, or sub-classifications used to identify various types of object representations. As described, the different object representations, include, for example, objects of different sizes, dimensions, and shape (e.g., cube, brick, etc.) and the characteristics (e.g., size, dimension, shape) of the different object representations can influence how objects appear when engraved in or otherwise within or on a surface of an object.

The training data can be labeled using one of any number of approaches. For example, the training data, which includes input (e.g., training data 402) and expected output pairs (e.g., training data 409) can be from a company database that has been annotated by human experts. In certain embodiments, a feature extractor can extract features of each image in training data 402 and 409, and a category model can process the features to attempt to determine the input image and expected output image based on the extracted features.

In some embodiments, a portion of the training set will be retained as testing set 410 to use to test the accuracy of the trained model.

In this example, the training data is accessible to a training module 404, which can feed the data to model 406 (e.g., a machine learning-based model) to train the network. Model 406 can include, for example, one of a logistic regression, Naïve B aye, random forest, neural network, or support vector machines (SVMs), convolutional recurrent neural network, deep neural network, or other types of neural networks or models, and/or combination of any of the above models, stacked models and heuristic rules. Various other approaches can be used as well as discussed and suggested elsewhere herein.

The training data can be provided to the model so the model can learn features associated with the images, including, for example, features associated with how content appears when engraved in or otherwise within or on a surface of an object. The network can then learn various combinations or relations of features of the images, such that when an image is processed with the trained model, the model can recognize the features and output the appropriate adjustment data or functions that control image modification operations.

As described, the model can be a neural network. Neural networks (NNs), such as convolutional neural networks, are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which, along with a set of adjacent layers, forms the convolution portion of the network. The bottom layer of the convolution layer, along with a lower layer and an output layer, make up the fully connected portion of the network. From the input layer, a number of output values can be determined from the output layer, which can include several items determined to be related to an input item, among other such options. CNN is trained on a similar data set (which includes content in object representations), so it learns the best feature representation of content for this type of image template.

In certain embodiments, once at least the initial training has completed, a testing module 408 can utilize the testing set 410 to test the trained model. Since the testing data already includes classification data, such as data operable to label, identify, or otherwise indicate ground truth, the classifications and adjustment data generated by the model can be compared against that data to determine the accuracy of the model, both overall and for different categories of object representations. In certain embodiments, the testing data can also be used to train the model further. The results can be analyzed, and if the results are acceptable, such as where the accuracy at least meets a minimum accuracy threshold for some or all of the classifications and adjustment data, the model can be provided to classifier 412 that is able to process a customer input image 414 for a particular object representation 415 and generate adjustment data 422.

Figure 5:
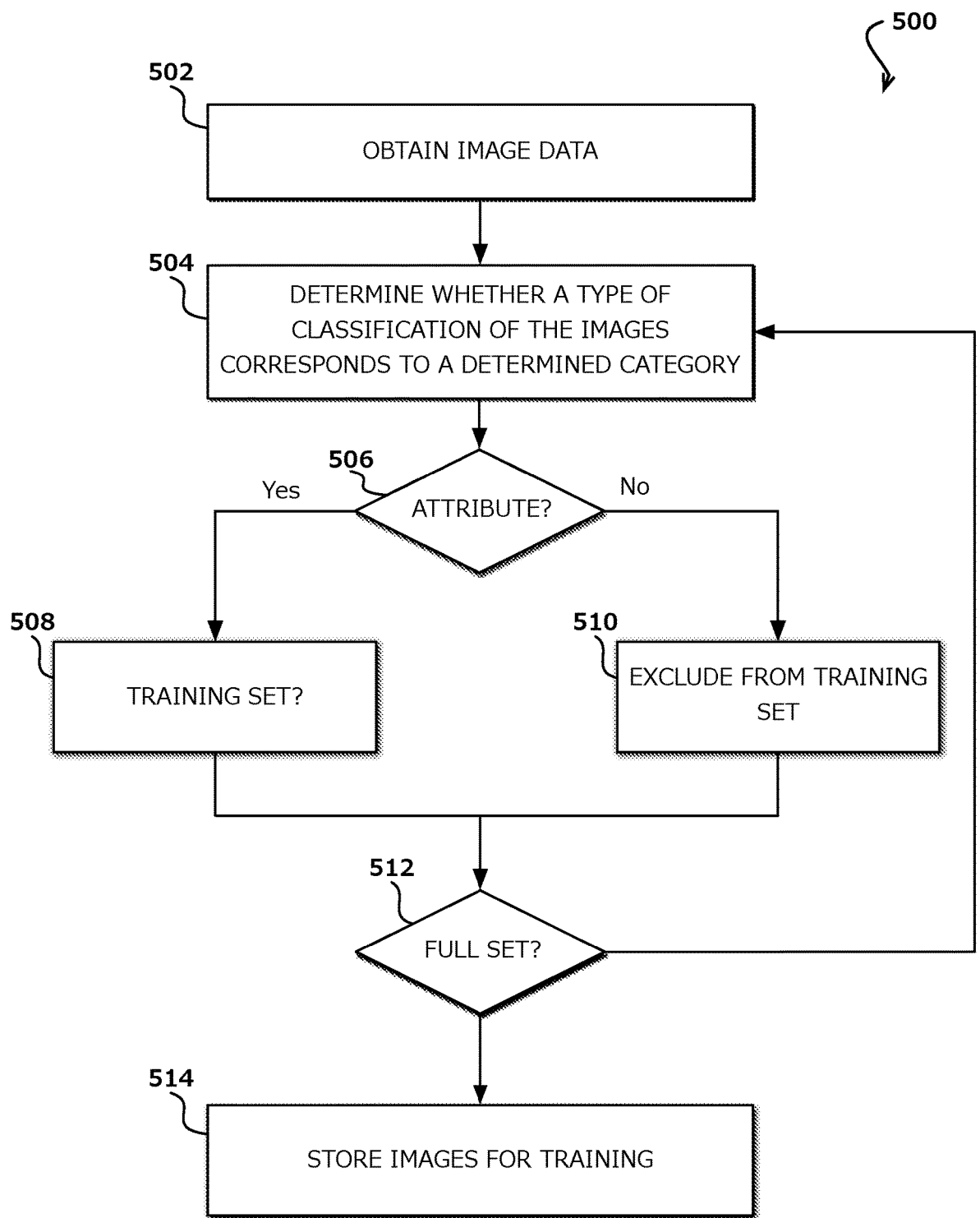
FIG. 5 illustrates an example process for determining training data that can be used in accordance with various embodiments.

FIG. 5 illustrates an example process 500 for determining training data that can be utilized in accordance with various embodiments. It should be understood that, for any process discussed herein, there can be additional, fewer, or alternative steps performed in similar or different orders, or in parallel, within the scope of the various embodiments unless otherwise stated. In this example, image data can be obtained 502 for analysis. The image data can include representations of content appearing as though it were engraved, etched, printed, etc. within (or on a surface of) an object. In an embodiment, the image data can be obtained by capturing images of engraved content and/or using various image processing techniques to create images of content appearing as though it were engraved, etched, printed, etc. within (or on a surface of) an object. In certain embodiments, the image data can be from one or more data stores maintained directly or indirectly by a content provider, resource provider, or a third-party, or from multiple sources, among other such options.

An object representation associated with each image (or other information associated with each image) can be used to determine 504 whether a type of classification of the image corresponds to a category and includes particular attributes, or types of attributes, for which a model (e.g., logistic regression, neural network, or another machine learning algorithm) can be trained. As described, the different object representations, can include, for example, objects of different sizes, dimensions, and shape (e.g., cube, brick, etc.) and the characteristics (e.g., size, dimension, shape) of the different object representations can influence how objects appear when engraved in or otherwise within or on a surface of an object.

If it is determined 506 that an image exhibits the attribute for a particular category, then that image and corresponding input image can be added 508 to the training set. In an embodiment, the training set can include pairs of images. For example, the training set can include an input image and a corresponding output image. The input image includes user-provided content. The output image is the content modified to appear engraved, etched, printed, etc. If not, that image can be excluded 510 from the training set. As mentioned elsewhere herein, in at least some embodiments, some of the images may be instead added to a testing set or not added to any set but may have the attribute classification associated therewith.

If it is determined 512 that a full training set has been obtained, using any appropriate criterion as discussed or suggested herein, such as a threshold number of images, then the training set generation can complete, and the images can be stored 514 for training and other purposes. Otherwise, the process can continue until a full set is obtained, all of the relevant image data is analyzed, or another stop condition is satisfied.

Figure 6:
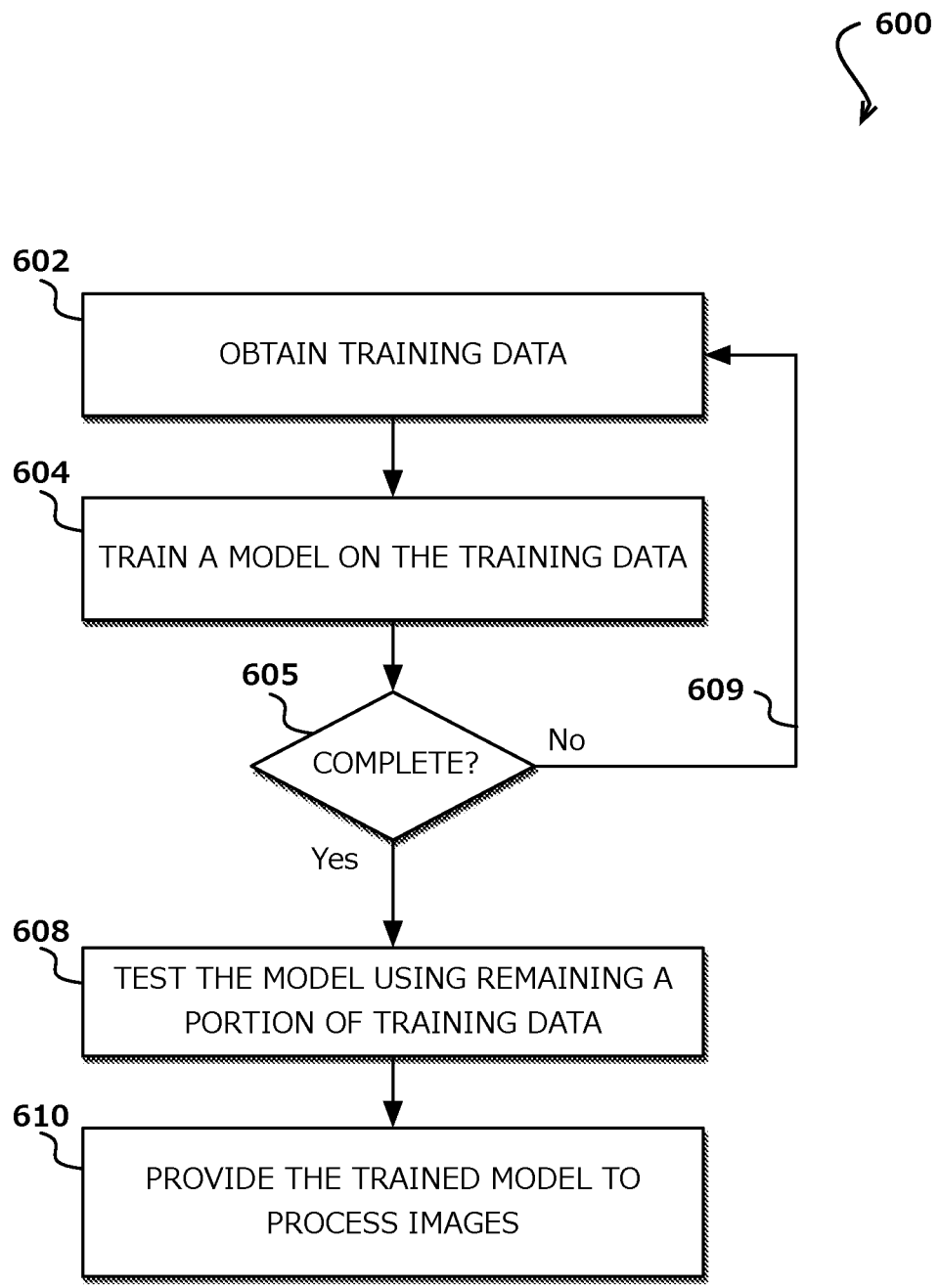
FIG. 6 illustrates an example process for training a model that can be utilized in accordance with various embodiments.

FIG. 6 illustrates an example process 600 for training a model that can be utilized in accordance with various embodiments. Once the training data is obtained 602, the training data can be provided as input to a model training process. The training data can include, for example, image pairs, where an input image includes a representation of content to be engraved and an output image includes a representation of the content appearing engraved, etched, printed, etc.

In the example of a neural network, or other machine learning-based model, the model can be trained 604 on the training data to learn various combinations or relations of features of the images, such that when an image is processed with the trained model, the model can recognize the features and output the appropriate adjustment data or function that controls image modification operations, although various other outputs can be utilized as well within the scope of the various embodiments. If it is determined 605 that a stop condition has been met so that training should be completed, such as by processing the entire training set, then the trained model can be provided to process, for example, customer provided images. As discussed herein, the model might first go through a process to test 608 using at least some of the training classified with the attribute type from earlier steps of the process. If the training is not complete, then the training process can continue 609 until a trained model is obtained. Thereafter, the trained model can be provided 610 to process query images to generate adjustment data to modify content to appear within (or on a surface of) objects.

Figure 7:
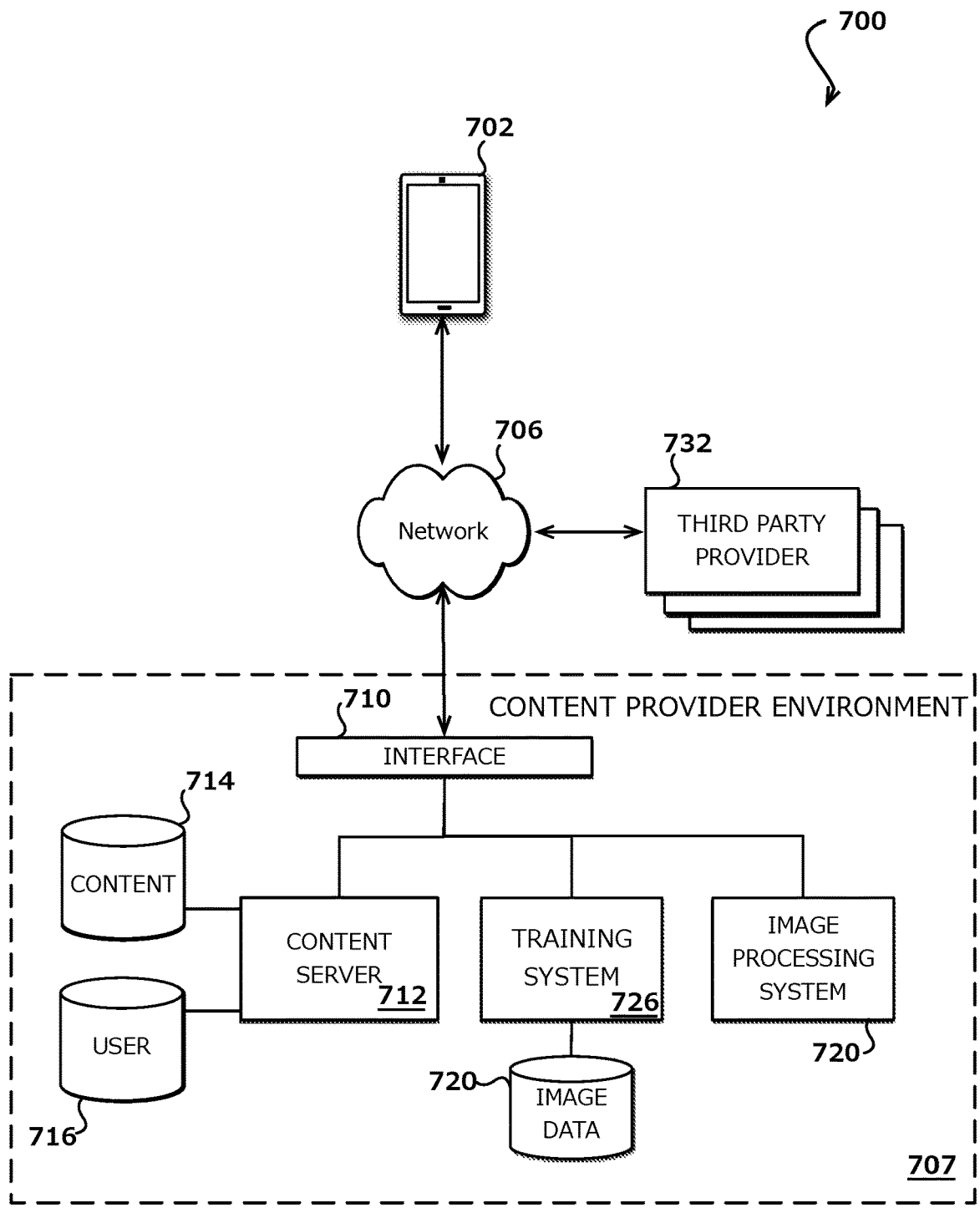
FIG. 7 illustrates an example environment in which aspects of the various embodiments can be implemented.

FIG. 7 illustrates an example environment 700 in which aspects of the various embodiments can be implemented. As mentioned elsewhere herein, various network training and image manipulation tasks can be performed on a client device or by a network service, among other such options. In this example, client device 702 can submit a request for content across at least one network 706 to be received by a content provider environment 707. As mentioned, in at least some embodiments, the request can be to add image data to a new or existing image. The client device 702 can be any appropriate computing device capable of requesting, receiving, and/or presenting content, such as may include a desktop computer, a thin client device or "dummy terminal," a smartphone, an e-book reader, a tablet computer, a notebook computer, a personal data assistant, a video gaming console or controller, a smart television, a wearable computer (e.g., a smartwatch or glasses), or a portable media player, among others.

The client device 702 is in communication with a content provider 707 via network 706. The at least one network can include a wired and/or wireless network, as may include the Internet, a cellular network, a local area network (LAN), an Ethernet, an Intranet, and the like. The client device 702 may have varied local computing resources, such as may include central processing units and architectures, memory, mass storage, graphics processing units, communication network availability and bandwidth, etc. The content provider 707 can include any appropriate resources for providing content from a resource provider, as may include various servers, datastores, and other such components known or used for providing content from across a network (or from the "cloud").

In this example, a call received to the content provider 707 can be received by an interface layer 710 of the environment. As known for network environments, the interface layer can include components such as interfaces (e.g., APIs), load balancers, request and/or data routers, and the like. If the request is a request for content, such as for content for image data to be provided to the client device, information for the request can be directed to one or more content servers 712, which can obtain the content from a content datastore 714 or other such repository to be sent back across the network(s) to the computing device. In some embodiments, information for the request might also be compared against user data in a user datastore 716 or other such location to determine, for example, whether the user has access rights to that content. In some cases, a call or request received to the content provider 707 might be from another entity, such as a third-party content provider 732. As discussed previously, such providers may provide images and information to be displayed to users, along with the served content. This content may relate to a specific item, product, person, etc. At least some of these images can be used to train neural networks, as discussed herein. In some embodiments, the content provider 707 will call into such a third-party system for the content.

The interface 710 and/or networking layer can include any of a number of components known or used for such purposes, as may include one or more routers, switches, load balancers, Web servers, application programming interfaces (APIs), and the like. The interface 710 can determine the type of call or request and cause information to be forwarded to the appropriate component or sub-system. For example, training images can be stored to datastore 720 for use in training a neural network or other model by a training system or service 726, with the resulting training sets being stored to the same or a different datastore, or the content repository 714. When a request to view content is received for processing, that request can be forwarded to the content server 712. The request can be associated with image data. Image processing component 720 can analyze the image data to determine the desired content for preview. In certain embodiments, the request may include information identifying the desired content and an object representation for which the content is to appear within (or on a surface of). Alternatively, content provider environment can analyze the image data to recommend suggested content and an object representation for the suggested content. Image processing component can perform segmentation processes, image modification processes, image blending processes, image sizing processes, image transformation processes, and the like.

Training system 726 can process the desired content to generate adjustment data or other data that controls image blending operations. Image processing component or another appropriate component can apply the adjustment data to the pixel values of the desired content to modify the desired content in order to enable a visualization of the content with (e.g., appearing within or in certain embodiments on a surface of) an object representation of the image template. In at least some embodiments, the content will be "blended" with the object representation of the template image, with the pixel values for the content being directly modified, added to, or otherwise averaged or mixed with, the pixel values for the corresponding pixel locations of the object representation. Image transformation techniques can be used to project the modified content onto the object representation in the image template. Thereafter, content server 712 can provide a visualization or preview of the content with (e.g., appearing within and/or in certain embodiments on a surface of) the representation of the object.

In accordance with various embodiments, additional or alternative components and elements can be used in such a system in accordance with the various embodiments. Accordingly, it should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein. In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the system. For example, the system can include various modules and components combined on a single device, multiple instances of a single module or component, etc. In one specific, non-limiting embodiment, training system 726 can execute on one device, and image processing system 720 can execute on another device. In another embodiment, the components and/or systems can execute on the same device or other combination of devices.

In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 8:
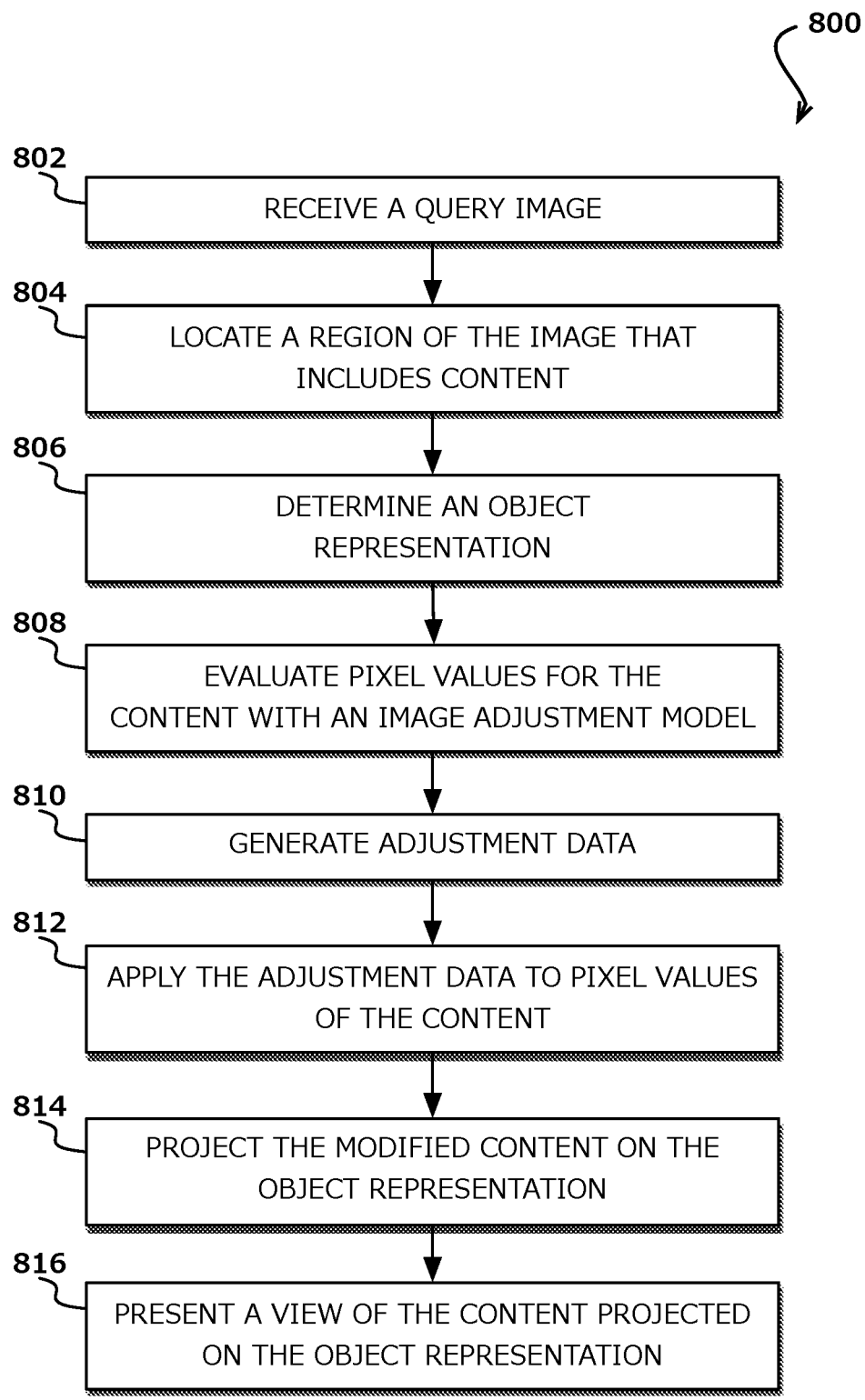
FIG. 8 illustrates an example process for generating content in accordance with various embodiments.

FIG. 8 illustrates an example process 800 for modifying image content in accordance with various embodiments. It should be understood that there can be additional, fewer, or alternative steps performed in similar or alternative orders, or in parallel, within the scope of the various embodiments unless otherwise stated. In this example, a query image, including content, is received 802. The image can be pre-processed as mentioned, such as to attempt to locate 804 a region of the image that includes desired content. In certain embodiments, the desired content could be selected by a user, for example, that wants to generate or receive some type of image that includes a representation of the content with (e.g., appearing within and/or in certain embodiments on a surface of) an object representation. In an embodiment, the object representation can be selected by the user or application or otherwise determined 806. The object can be one of a set of object types, where each object type can be associated with a number of attributes or characteristics specifying a shape of the object, a size of the object, among other characteristics described herein. Each object in the set of objects can be associated with an object classification or category, and each object classification can be associated with a trained model. Once the object representation is determined, a trained model can be selected. For example, the object classification associated with the object representation can be compared with a set of object classifications for trained models. A matching object classification that corresponds to the object classification with at least a minimum level of confidence can be selected and the trained model associated with the matching object classification can be obtained. The trained model (e.g., an image adjustment model such as a neural network or another machine learning-based model) can evaluate or otherwise process 808 the pixel values for the content for the particular object representation to generate 810 adjustment data or other data that can be used to control image modification operations. The adjustment data can be applied 812 to the pixel values of the content to modify the content in the region in order to enable a visualization of the content with (e.g., appearing within and/or in certain embodiments on a surface of) the object representation. For example, the content can be modified such that the object representations appear to "blend" and appear within the object representation. This can include, for example, modifying pixel values of the content or adding, averaging, or otherwise combining pixel values of the content with the pixel values for the corresponding pixel locations of the object representation. In at least some embodiments, an object classification can correspond to the adjustment data, and a gradient of an image patch for that classification can be added to, or blended with, the pixel values of the content represented in the region in order to enable a visualization of the content within (or on a surface of) the object representation. In another example includes, for example, determining a set of pixel locations associated with the object representation, determining a respective pixel value for an individual pixel location of the set of pixel locations, determining a corresponding pixel location in the template image for the individual pixel location, and blending the respective pixel value with the corresponding pixel value for the corresponding pixel location based at least in part on the adjustment data. An image transformation approach can be applied to pixel values of the modified content to project 814 the modified content on the object representation. Thereafter, a visualization or preview of the content projected on the object representation can be presented 816. As described, this can include, for example, an image of the content appearing engraved in a glass crystal. In at least some embodiments, at least one parameter for use in generating a stylized visualization can be received, where, the at least one parameter includes at least one of a size, aspect ratio, opacity, style, or weighting. In an example, in the situation where a weighting of the respective pixel value with respect to a corresponding pixel value for the corresponding pixel location is received, the weighting can be changed to affect a visibility of the object in a visualization when presented.

Figure 9:
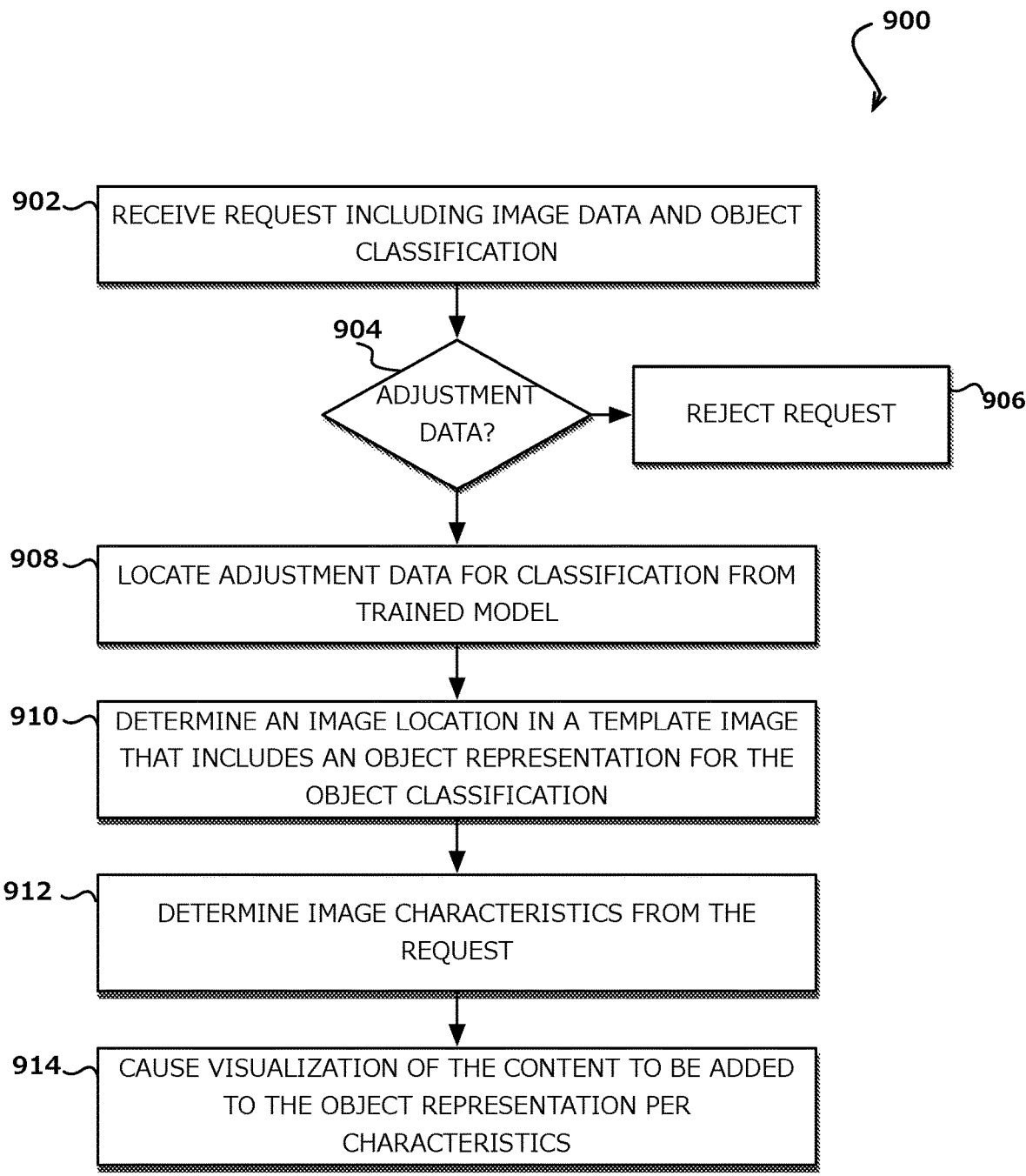
FIG. 9 illustrates an example process for modifying image content in accordance with various embodiments.

FIG. 9 illustrates an example process 900 for modifying image content in accordance with various embodiments. In this example, a request is received 902 that is associated with image data and specifies an object classification, category, or other identification. As mentioned, this can be a text query provided by a user, a selection from a list, obtained from a query image, or received from another such source. In this example, a determination can be made 904 as to whether there is a corresponding data set or adjustment data available for that classification. For example, in some embodiments, an object representation may not be available in that an object category for the selected object representation has not yet been trained for that particular classification, among other such possibilities. If no matching data set can be located, the request can be denied 906, and other object representations suggested. In some embodiments, the user can have the option to train a model (e.g., neural network) for the specific classification, which can then be offered or available for use.

If a data set for the classification exists, the data set can be located 908 either locally or from a remote source. In at least some embodiments, the data sets can be stored in different locations than where the neural networks are trained, and data sets might be available from multiple sources. Once the data set is located, a process can attempt to utilize that data to update an existing image or create a new image in accordance with embodiments described herein. Based at least in part upon the request, a location in a template image that includes an object representation for the object classification can be determined 910 where the visualization is to be added or placed. One or more characteristics for the visualization can also be determined 912 from the request. These can include, for example, the size, style, weight, and other such aspects. These can be set ahead of time and/or adjusted after placement in at least some embodiments. A visualization of the content within (or on a surface of) the object representation corresponding to the data set can then be caused 914 to be added to an image per the specified characteristics. As mentioned, this can include modifying the pixel values of the content, blending pixel values of the content with pixel values of the template image that includes the object representation, setting the pixel values to pixel values corresponding to the data set per the specifications, among other such options. Image transformation techniques can be used to project the content onto the object representation in the image template.

Figure 10:
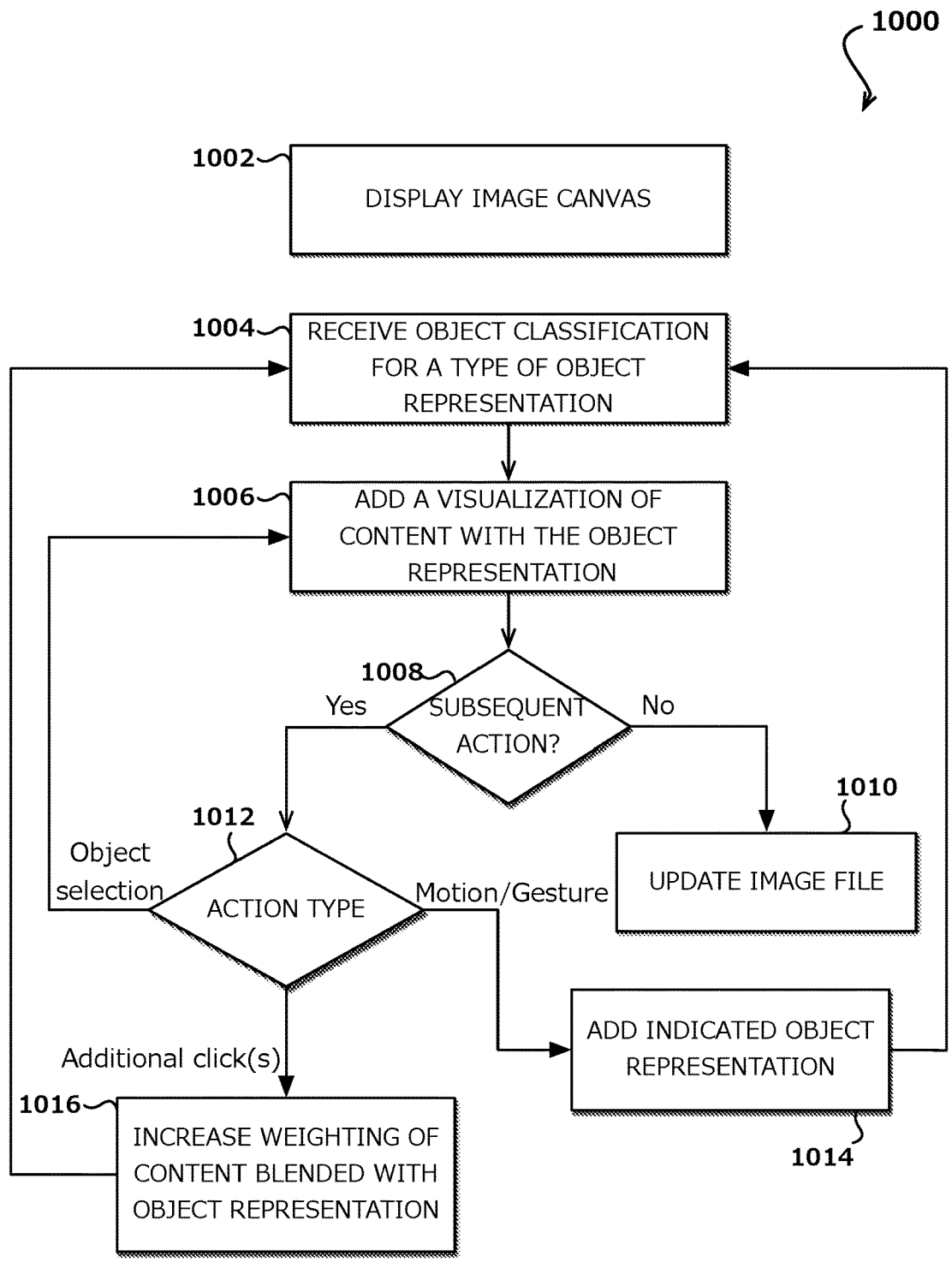
FIG. 10 illustrates an example process for modifying image content in accordance with an alternate embodiment.

Once a visualization of the content appearing with (e.g., appearing within or in certain embodiments on a surface of) the object representation is complete, further updates to the image can be made. For example, in process 1000 illustrated in FIG. 10, an image canvas can be displayed 1002, and an object classification for a type of object representation is received 1004, such as from a user or artist. As described, object classification or object categories include representations of objects of different shapes such as cubes, bricks, triangles, etc. A visualization of content appearing within (or on a surface of) the object representation corresponding to the object classification can then be added 1006 to an image. This can be an additional object with content added to an image or a new object with content added to a blank image canvas, among other such options. If there are no subsequent actions, such as where the user only wanted to add a single object with content, then the image file can be updated 1010 with the updated pixel values resulting from the addition. If an additional subsequent (and related) action is detected 1008, for example, then a determination of the type of action can be made 1012. In some embodiments, the user might select to change the object representation, in which case the visualization can be updated 1006 as discussed previously. If additional selections are detected, such as additional mouse clicks or touch screen taps, then the weighting of the content blended with the object representation can be increased 1016. As mentioned, the blending of the content with the existing pixel values can be increased in some embodiments by repeated input by the user, such as where the content will become increasingly visible (e.g., less transparent) or present in the image until such point that the user is satisfied with the appearance, after which the user will quit providing the repetitive input, etc. Another detected action can include the detection of a motion, gesture, or other such action associated with a paint, pattern or fill input, for example, in response to which one or more additional visualizations of the content in different object representations can be added 1014 to the image, such as to preview content in different objects based on the object category. Various other actions and updates can be performed or executed as well as discussed and suggested elsewhere herein.

Figures 11A, 11B:
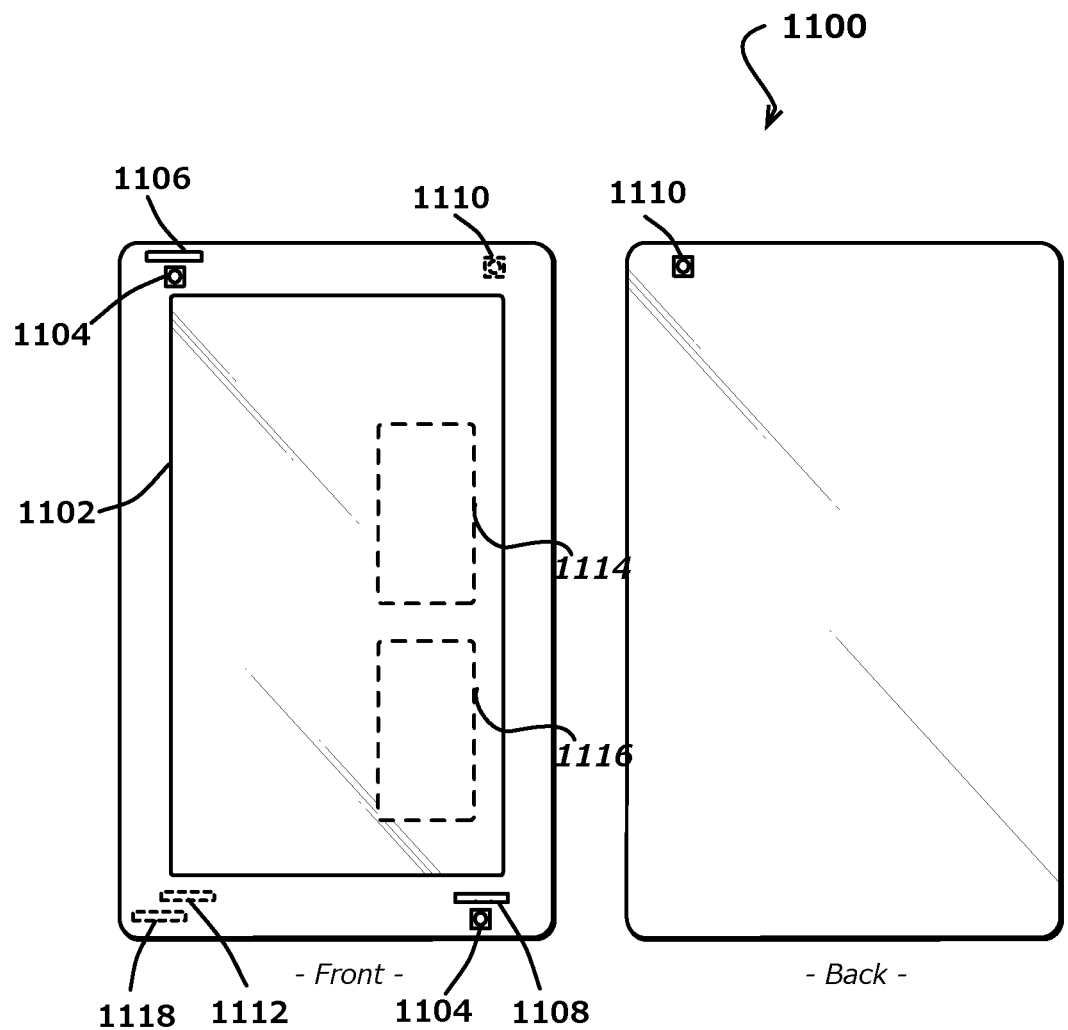
FIGS. 11A and 11B illustrate front and back views of an electronic device in accordance with an embodiment.

FIG. 11A illustrates a front view of an electronic device and FIG. 11B illustrates a back view of the example electronic computing device 1100 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein, where the devices can include, for example, head-mounted displays, notebook computers, personal data assistants, cellular phones, smart glasses or goggles, smartwatch, unmanned vehicles such as drones or other autonomous vehicles, and portable media players, among others.

In this example, the computing device 1100 has a display screen 1102 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1104 on the front of the device and at least one image capture element 1110 on the back of the device. It should be understood, however, that image capture elements could also, or alternatively, be placed on the sides or corners of the device, and that there can be any appropriate number of capture elements of similar or different types. Each image capture element 1104 and 1110 may be, for example, a camera, a charge-coupled device (CCD), a motion detection sensor or an infrared sensor, or other image capturing technology.

The device can use the images (e.g., still or video) captured from the imaging elements 1104 and 1110 to generate a three-dimensional simulation of the surrounding environment (e.g., a virtual reality of the surrounding environment for display on the display element of the device). Further, the device can utilize outputs from at least one of the image capture elements 1104 and 1110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1108 on the front side, one microphone 1112 on the back, and one microphone 1106 on or near a top or side of the device. In some devices there may be only one microphone, while in other devices there might be at least one microphone on each side and/or corner of the device, or in other appropriate locations.

The device 1100 in this example also includes one or more orientation- or position-determining elements 1118 operable to provide information such as a position data, direction data, motion data, or orientation data for the device. These elements can include, for example, accelerometers, inertial sensors, electronic gyroscopes, and electronic compasses.

The example device also includes at least one communication mechanism 1114, such as may include at least one wired or wireless component operable to communicate with one or more electronic devices. The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

FIG. 12 illustrates a set of basic components of an electronic computing device 1200, such as computing device 1100 in FIGS. 11A and 11B. In various embodiments, computer device 1200 may be used to implement any of the systems, devices, or methods described herein. In some embodiments, computer device 1200 may correspond to any of the various devices described herein, including, but not limited to, mobile devices, tablet computing devices, wearable devices, personal or laptop computers, vehicle-based computing devices, or other devices or systems described herein. As shown in FIG. 12, computer device 1200 can include various subsystems connected by a bus 1202. The subsystems may include an I/O device subsystem 1204, a display device subsystem 1206, and a storage subsystem 1210 including one or more computer-readable storage media 1208. The subsystems may also include a memory subsystem 1212, a communication subsystem 1220, and a processing subsystem 1222.

In device 1200, bus 1202 facilitates communication between the various subsystems. Although a single bus 1202 is shown, alternative bus configurations may also be used. Bus 1202 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1202 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1204 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1204 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer device 1200 may include a display device subsystem 1206. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1206 may include a controller and/or interface for controlling and/or communicating with an external display, such as any of the above-mentioned display technologies.

As shown in FIG. 12, device 1200 may include storage subsystem 1210 including various computer-readable storage media 1208, such as hard disk drives, solid-state drives (including RAM-based and/or flash-based SSDs), or other storage devices. In various embodiments, computer-readable storage media 1208 can be configured to store software, including programs, code, or other instructions, that is executable by a processor to provide the functionality described herein. For example, the instructions, when executed, can enable a computing device to perform automated document negotiation in accordance with the present disclosure may be embodied on a computer-readable medium. This may include automatically obtaining information from parties seeking to negotiate document sections of a document such as a contract; generating a ranking value or other such document selection value for a plurality of candidate contracts possible between the parties based on information from the parties, including their preferences for different sections (e.g., provisions) of the contract; and using the values to optimize an optimization function (e.g., a cost function or other such function) that measures the degree to which candidate contracts satisfy the information provided by the parties to determine a document or document information that satisfies constraints of the parties.

In some embodiments, storage system 1210 may include various datastores or repositories or interface with various datastores or repositories that store data used with embodiments described herein. Such datastores may include, databases, object storage systems and services, data lakes or other data warehouse services or systems, distributed datastores, cloud-based storage systems and services, file systems, and any other data storage system or service. In some embodiments, storage system 1210 can include a media reader, card reader, or other storage interfaces to communicate with one or more external and/or removable storage devices. In various embodiments, computer-readable storage media 1208 can include any appropriate storage medium or combination of storage media. For example, computer-readable storage media 1208 can include, but is not limited to, any one or more of random access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1212 can include various types of memory, including RAM, ROM, flash memory, or other memory. Memory 1212 can include SRAM (static RAM) or DRAM (dynamic RAM). In some embodiments, memory 1212 can include a BIOS (basic input/output system) or other firmware configured to manage initialization of various components during, e.g., startup. As shown in FIG. 12, memory 1212 can include applications 1214 and application data 1216. Applications 1214 may include programs, code, or other instructions, that can be executed by a processor. Applications 1214 can include various applications such as browser clients, campaign management applications, data management applications, and any other application. Application data 1216 can include any data produced and/or consumed by applications 1214. Memory 1212 can additionally include operating system 1218, such as macOS®, Windows®, Linux®, various UNIX® or UNIX- or Linux-based operating systems, or other operating systems.

Device 1200 can also include a communication subsystem 1220 configured to facilitate communication between device 1200 and various external computer systems and/or networks (such as the Internet, a local area network (LAN), a wide area network (WAN), a mobile network, or any other network). Communication subsystem 1220 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 1220 can include hardware and/or software components to communicate with satellite-based or ground-based location services, such as GPS (global positioning system). In some embodiments, communication subsystem 1220 may include, or interface with, various hardware or software sensors. The sensors may be configured to provide continuous or and/or periodic data or data streams to a computer system through communication subsystem 1220

As shown in FIG. 12, processing system 1222 can include one or more processors or other devices operable to control computing device 1200. Such processors can include single-core processors 1224, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1222, such as processors 1224 and 1226, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

Figure 13:
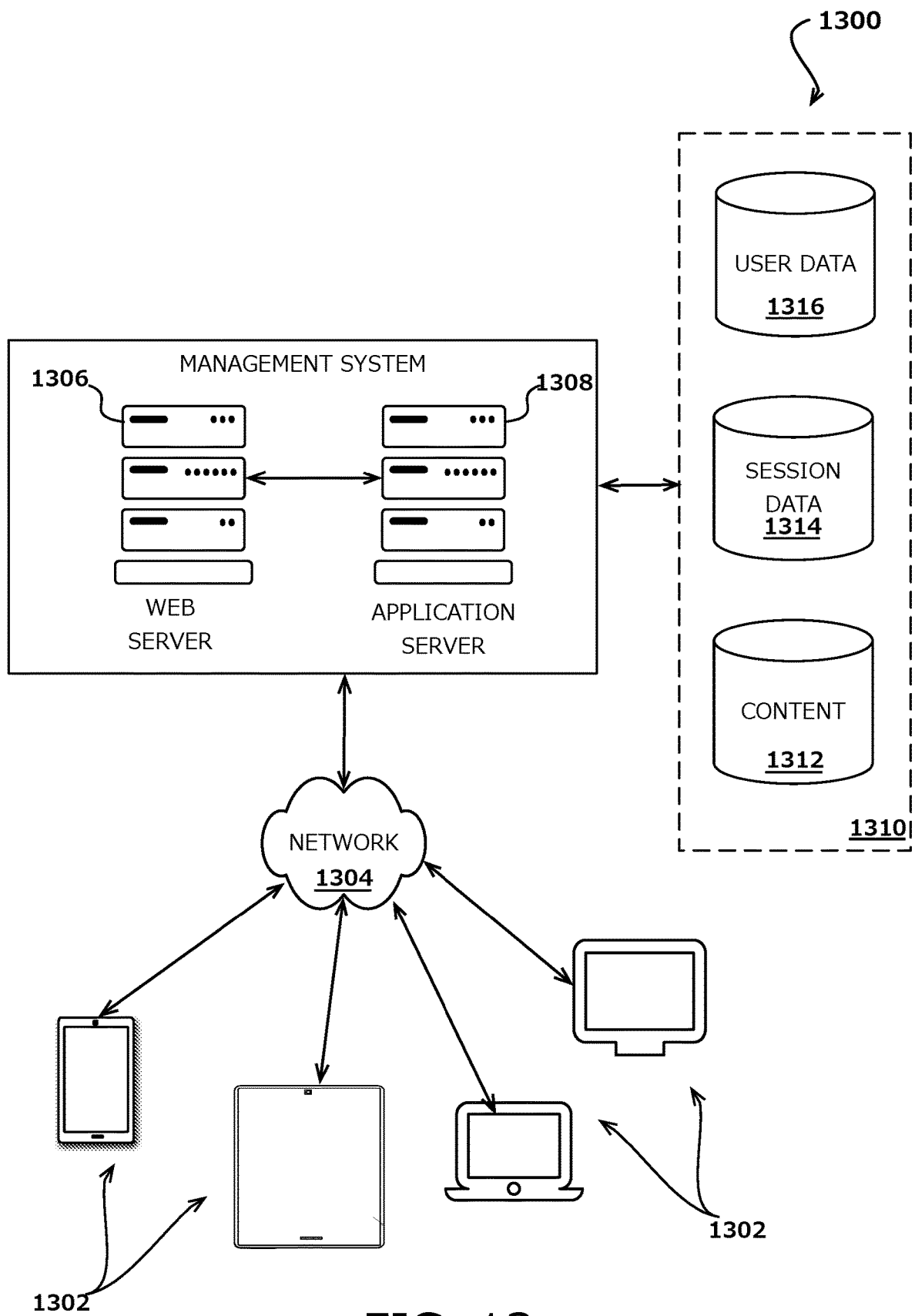
FIG. 13 illustrates an example of an environment for implementing aspects in accordance with various embodiments.

FIG. 13 illustrates an example of an environment 1300 for implementing aspects in accordance with various embodiments. As will be appreciated, although a Web-based environment is used for purposes of explanation, different environments may be used, as appropriate, to implement various embodiments. The environment includes electronic client devices 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a datastore 1310. It should be understood that there can be several application servers, layers or other elements, processes or components, which may be chained or otherwise configured, which can interact to perform tasks such as obtaining data from an appropriate datastore. As used herein, the term "datastore" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the datastore 1310 as needed to execute aspects of one or more applications for the client device and handling a majority of the data access and business logic for an application. The application server provides access control services in cooperation with the datastore and can generate content such as text, graphics, audio and/or video to be transferred to the user, which may be served to the user by the Web server 1306 in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The datastore 1310 can include several separate data tables, databases or other data storage mechanisms and media for storing data relating to a particular aspect. For example, the datastore illustrated includes mechanisms for storing content (e.g., production data) 1312 and user information 1316, which can be used to serve content for the production side. The datastore is also shown to include a mechanism for storing log or session data 1314. It should be understood that there can be many other aspects that may need to be stored in the datastore, such as page image information and access rights information, which can be stored in any of the above listed mechanisms as appropriate or in additional mechanisms in the datastore 1310. The datastore 1310 is operable, through logic associated therewith, to receive instructions from the application server 1308 and obtain, update or otherwise process data in response thereto.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

An environment such as that illustrated in FIG. 13 can be useful for a provider such as an on-demand mixed-reality provider who wishes to enable data capture for use in on-demand mixed-reality experiences (e.g., a live event service, a shopping service, etc.). The provider can utilize a collaborative data capture service which can coordinate the capture of content, generate and present for display mixed-reality experiences from the captured content, connect users (e.g., virtual travelers or virtual participants, or requestors) to providers (e.g., on-demand providers), facilitate payment between requestors and providers, facilitate content licensing between license holders and providers, streamline copyright use, etc.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. A computer-implemented method, comprising:
    obtaining a plurality of image pairs, an image pair associated with a particular object classification and including a first image associated with a first representation of content and a second image associated with a second representation of the content appearing with one of a plurality of object representations specified by the particular object classification;
    training image adjustment models on the plurality of image pairs for a plurality of object classifications;
    receiving a request to view desired content represented in query image data, the query image data associated with a first representation of desired content that is be viewed with a type of object, the type of object associated with an object classification;
    evaluating a trained image adjustment model for the object classification on the query image data to generate image adjustment data;
    applying the image adjustment data to pixels values of the first representation of desired content to generate a second representation of the desired content;
    using an image transformation technique on the second representation of the desired content to project the second representation of the desired content to an image template that includes the object representation;
    generating a visualization of the desired content with the object representation; and
    presenting the visualization of the desired content with the object representation, wherein the visualization includes an image that previews what the desired content looks like when the desired content is one of etched or engraved within at least one of a crystal object or a glass object.

2. The computer-implemented method of claim 1, further comprising:
    receiving a selection of the object representations from a set of object representations, individual object representations associated with respective object classifications and respective trained image adjustment models;
    obtaining the image template that includes the object representation; and
    obtaining the trained adjustment model corresponding to the image template.

3. The computer-implemented method of claim 1, further comprising:
    receiving a selection of a different object representation from a set of object representations; and
    presenting an updated visualization of the desired content based at least in part upon a shape of the different object representation.

4. The computer-implemented method of claim 1, further comprising:
    receiving at least one parameter for use in generating a stylized visualization, the at least one parameter including at least one of a size, aspect ratio, opacity, style, or weighting.

5. The computer-implemented method of claim 1, further comprising:
    determining a set of pixel locations associated with the object representation;
    determining a respective pixel value for an individual pixel location of the set of pixel locations;
    determining a corresponding pixel location in the template image for the individual pixel location; and
    blending the respective pixel value with the corresponding pixel value for the corresponding pixel location based at least in part on the adjustment data.

6. The computer-implemented method of claim 5, further comprising:
    changing a weighting of the respective pixel value with respect to a corresponding pixel value for the corresponding pixel location to affect a visibility of the object in the visualization when presented.

7. A system, comprising:
    at least one computer comprising at least one processor and at least one memory, the at least one computer configured to:
        obtain a plurality of image pairs, an image pair associated with a particular object classification and including a first image associated with a first representation of content and a second image associated with a second representation of the content appearing with one of a plurality of object representations specified by the particular object classification;
        train models on the plurality of image pairs for a plurality of object classifications;
        receive a request to view content represented in query image data with a type of object, the type of object associated with a template image that includes a representation of the type of object, the type of object associated with an object classification;
        evaluate a trained model for the object classification on the query image data to generate image adjustment data;
        apply the image adjustment data to the content to generate modified content;
        use an image transformation technique on the modified content to project the modified content to the image template; and
        generate a visualization of the modified content with the type of object, wherein the visualization includes an image that previews what the content looks like when the content is one of etched or engraved within at least one of a crystal object or a glass object.

8. The system of claim 7, wherein the type of object further represents one of a lens, a prism, a plaque, a trophy, an award, or a window.

9. The system of claim 7, wherein the type of object is at least partially transparent, and wherein a shape of the type of object is three-dimensional.

10. The system of claim 7, wherein the visualization includes text appearing with the content.

11. The system of claim 7, wherein the at least one computer is further configured to:
    train a plurality of models using images of objects of different types corresponding to a plurality of object classifications; and
    store a plurality of trained models.

12. The system of claim 7, wherein the at least one computer is further configured to:
- compare the object classification associated with the request with a set of object classifications for trained models;
- select a matching object classification that corresponds to the object classification with at least a minimum level of confidence; and
- obtain the trained model associated with the matching object classification.

13. The system of claim 7, wherein the at least one computer is further configured to: use a segmentation process to determine a foreground image portion of the query image data and a background image portion, the foreground image portion including the content.

14. The system of claim 7, wherein the content includes one of a person, an animal, a building, nature, geography, or an event.

15. One or more non-transitory, computer-readable media comprising computer executable instructions that, when executed, cause at least one processor to perform actions comprising:
- obtaining a plurality of image pairs, an image pair associated with a particular object classification and including a first image associated with a first representation of content and a second image associated with a second representation of the content appearing with one of a plurality of object representations specified by the particular object classification;
- training models on the plurality of image pairs for a plurality of object classifications;
- receiving a request to view content represented in query image data with a type of object, the type of object associated with a template image that includes a representation of the type of object, the type of object associated with an object classification;
- evaluating a trained model for the object classification on the query image data to generate image adjustment data;
- applying the image adjustment data to the content to generate modified content;
- using an image transformation technique on the modified content to project the modified content to the image template; and
- generating a visualization of the modified content with the type of object, wherein the visualization includes an image that previews what the content looks like when the content is one of etched or engraved within at least one of a crystal object or a glass object.

16. The one or more non-transitory, computer-readable media of claim 15, wherein the at least one processor further performs actions comprising:
- receiving a selection of the type of object from a set of object types, individual object types associated with respective object classifications and respective trained models; and
- obtaining the trained model corresponding to the type of object.

17. The one or more non-transitory, computer-readable media of claim 15, wherein the at least one processor further performs actions comprising:
- receiving a request of text to appear with the content; and
- presenting the visualization of the modified content with the text.

18. The one or more non-transitory, computer-readable media of claim 15, wherein an image pair includes an input image and an output image, the input image corresponding to a representation of content, the output image including a representation of the content modified to appear engraved.

* * * * *